US012205528B2

(12) United States Patent
Xu

(10) Patent No.: US 12,205,528 B2
(45) Date of Patent: Jan. 21, 2025

(54) DISPLAY PANEL AND DISPLAY APPARATUS INCLUDING THE DISPLAY PANEL

(71) Applicant: Wuhan Tianma Microelectronics Co., Ltd., Wuhan (CN)

(72) Inventor: Junbo Xu, Wuhan (CN)

(73) Assignee: WUHAN TIANMA MICROELECTRONICS CO., LTD., Wuhan (CN)

(*) Notice: Subject to any disclaimer, the term of this patent is extended or adjusted under 35 U.S.C. 154(b) by 56 days.

(21) Appl. No.: 18/143,088

(22) Filed: May 4, 2023

(65) Prior Publication Data

US 2024/0274062 A1 Aug. 15, 2024

(30) Foreign Application Priority Data

Feb. 14, 2023 (CN) ......................... 202310130639.0

(51) Int. Cl.
*G09G 3/32* (2016.01)

(52) U.S. Cl.
CPC ....... *G09G 3/32* (2013.01); *G09G 2300/0852* (2013.01); *G09G 2310/0251* (2013.01)

(58) Field of Classification Search
CPC ............. G09G 3/32; G09G 2300/0852; G09G 2310/0251
See application file for complete search history.

(56) References Cited

U.S. PATENT DOCUMENTS

| | | | | |
|---|---|---|---|---|
| 2004/0217925 | A1 | 11/2004 | Chung et al. | |
| 2016/0180767 | A1* | 6/2016 | Sakariya | G09G 3/3233 345/212 |
| 2018/0190197 | A1 | 7/2018 | Chang et al. | |
| 2018/0357959 | A1 | 12/2018 | Xiang et al. | |

(Continued)

FOREIGN PATENT DOCUMENTS

| | | | |
|---|---|---|---|
| CN | 105096819 | A | 11/2015 |
| CN | 109119029 | A | 1/2019 |
| CN | 110473503 | A | 11/2019 |

(Continued)

OTHER PUBLICATIONS

The First Office Action for Chinese Application No. 202310130639.0, dated Mar. 6, 2024, 13 pages.

*Primary Examiner* — Afroza Chowdhury
(74) *Attorney, Agent, or Firm* — East IP P.C.

(57) ABSTRACT

The present application provides a display panel and a display apparatus. The display panel includes a plurality of pixel units arranged in an array, each of the pixel units includes a pixel circuit and a light emitting element; the pixel circuit includes a data writing module, a driving module, a light emitting control module and a pre-charging module; the data writing module is configured to provide a data signal to the driving module; the driving module is configured to provide a driving current to the light emitting element; the light emitting control module is configured to selectively allow the light emitting element to enter a light emitting stage; and the pre-charging module is configured to (Continued)

increase a voltage of a first node to a first voltage in a non-light emitting stage, in which the first voltage is less than a light emitting threshold voltage of the light emitting element.

20 Claims, 9 Drawing Sheets

(56) References Cited

U.S. PATENT DOCUMENTS

| | | | | |
|---|---|---|---|---|
| 2019/0206307 | A1* | 7/2019 | Schubert | G09G 3/32 |
| 2023/0157085 | A1* | 5/2023 | Kim | H10K 71/861 345/204 |

FOREIGN PATENT DOCUMENTS

| | | | |
|---|---|---|---|
| CN | 112037716 | A | 12/2020 |
| CN | 112908264 | A | 6/2021 |
| CN | 114724519 | A | 7/2022 |
| CN | 115662356 | A | 1/2023 |
| KR | 1020150077897 | A | 7/2015 |

* cited by examiner

DISPLAY PANEL AND DISPLAY APPARATUS INCLUDING THE DISPLAY PANEL

CROSS-REFERENCE TO RELATED APPLICATION

This application claims priority to Chinese Patent Application No. 202310130639.0, filed on Feb. 14, 2023, which is incorporated herein by reference in its entirety.

TECHNICAL FIELD

The present application relates to the field of display technology, and particularly to a display panel and a display apparatus.

BACKGROUND

Currently, a display panel usually includes a plurality of light emitting pixels arranged in an array, and the light emitting pixel includes a pixel circuit and a light emitting element. The pixel circuit usually includes a Thin Film Transistor (TFT) and a capacitor. The light emitting element may usually include an Organic Light emitting Diode (OLED) or other light emitting devices.

The light emitting process of the light emitting element includes a non-light emitting stage and light emitting stage. In the non-light emitting stage, the potential of anode of the light emitting element is reset though an initialization signal; and in the light emitting stage, the pixel circuit may connect a power signal to the anode of the light emitting element, so that the potential of anode of the light emitting element gradually increases and starts emitting light. Since the initial potential of anode of the light emitting element is low, the light emitting element needs to be charged for a period of time in the light emitting stage to start emitting light, and the overall brightness of the light emitting element in the first frame is low when switching from low brightness to high brightness.

SUMMARY

The embodiments of the present application provide a display panel and a display apparatus.

In a first aspect, the embodiments of the present application provide a display panel including a plurality of pixel units arranged in an array, each of the pixel units including a pixel circuit and a light emitting element; the pixel circuit including a data writing module, a driving module, a light emitting control module and a pre-charging module; the data writing module being configured to provide a data signal to the driving module; the driving module being configured to provide a driving current to the light emitting element; the light emitting control module being configured to selectively allow the light emitting element to enter a light emitting stage; and the pre-charging module being configured to increase a voltage of a first node to a first voltage in a non-light emitting stage, the first node being electrically connected to the light emitting control module and the light emitting element, in which the first voltage is less than a light emitting threshold voltage of the light emitting element.

In a second aspect, the embodiments of the present application provide a display apparatus including a display panel, the display panel including a plurality of pixel units arranged in an array, each of the pixel units including a pixel circuit and a light emitting element; the pixel circuit including a data writing module, a driving module, a light emitting control module and a pre-charging module; the data writing module being configured to provide a data signal to the driving module; the driving module being configured to provide a driving current to the light emitting element; the light emitting control module being configured to selectively allow the light emitting element to enter a light emitting stage; and the pre-charging module being configured to increase a voltage of a first node to a first voltage in a non-light emitting stage, the first node being electrically connected to the light emitting control module and the light emitting element, in which the first voltage is less than a light emitting threshold voltage of the light emitting element.

BRIEF DESCRIPTION OF THE DRAWINGS

In order to more clearly illustrate the technical solutions of the embodiments of the present application, the drawings to be used in the embodiments of the present application will be briefly introduced below. It is obvious that the drawings described below are merely some embodiments of the present application, and for those of ordinary skill in the art, other drawings can be obtained based on these drawings without inventive effort.

In the drawings.

Figure 1:
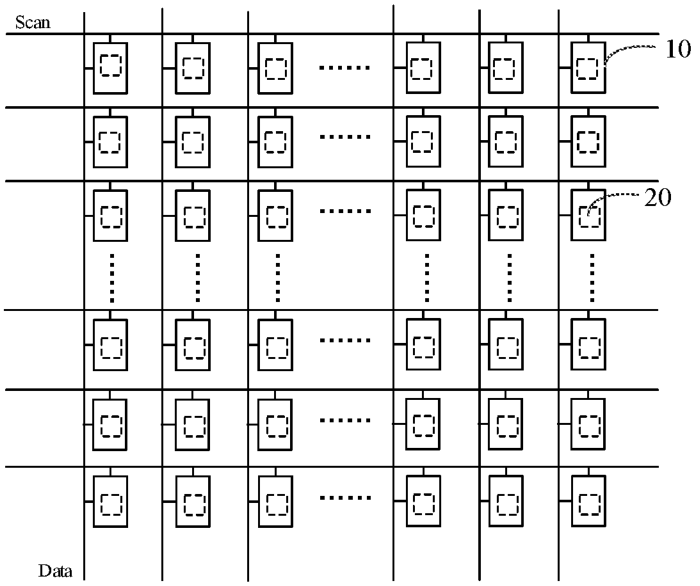
FIG. 1 shows a schematic structural diagram of a display panel according to an embodiment of the present application.

1, display area; 2, non-display area; 10, pixel unit; 20, pixel circuit; L, light emitting element; 21, light emitting control module; 22, data writing module; 23, driving module; 24, pre-charging module; N1, first node; 241, charging unit; 242, energy storage unit; 243, discharging unit; 25, first initialization module; 26, second initialization module; M1, first light emitting control transistor; M2, data writing transistor; M3, driving transistor; M4, compensation transistor; M5, first initialization transistor; M6, second light emitting control transistor; M7, second initialization transistor; M8, discharging transistor; M9, charging transistor; Cst, storage capacitor; C, energy storage capacitor; PVDD, first power signal line; PVEE, second power signal line; DDIC, driving chip; Frame1, first side frame area; Frame2, second side frame area; Frame3, third side frame area.

DETAILED DESCRIPTION

Features and exemplary embodiments of various aspects of the present application will be described in detail below. In order to make the objectives, technical solutions, and advantages of the present application clearer, the present application will be further described in detail below with reference to the drawings and specific embodiments. It should be understood that the specific embodiments described herein are merely intended to explain the present application, rather than to limit the present application. For those skilled in the art, the present application can be implemented without some of these specific details. The following description of the embodiments is merely to provide a better understanding of the present application by illustrating the examples of the present application.

It should be noted that, in the present application, relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

It should be noted that the embodiments of the present application and the features in the embodiments can be combined with each other without conflict. The embodiments will be described in detail below in conjunction with the accompanying drawings.

Currently, a display panel usually includes a plurality of light emitting pixels arranged in an array, and the light emitting pixel includes a pixel circuit and a light emitting element. The pixel circuit usually includes a Thin Film Transistor (TFT) and a capacitor. The light emitting element may usually include an Organic Light emitting Diode (OLED) or other light emitting devices.

The light emitting process of the light emitting element includes a non-light emitting stage and light emitting stage. In the non-light emitting stage, the potential of anode of the light emitting element is reset though an initialization signal; and in the light emitting stage, the pixel circuit may connect a power signal to the anode of the light emitting element, so that the potential of anode of the light emitting element gradually increases and starts emitting light. Since the initial potential of anode of the light emitting element is low, the light emitting element needs to be charged for a period of time in the light emitting stage to start emitting light, and the overall brightness of the light emitting element in the first frame is low when the displayed image switches from low brightness to high brightness.

Figure 2:
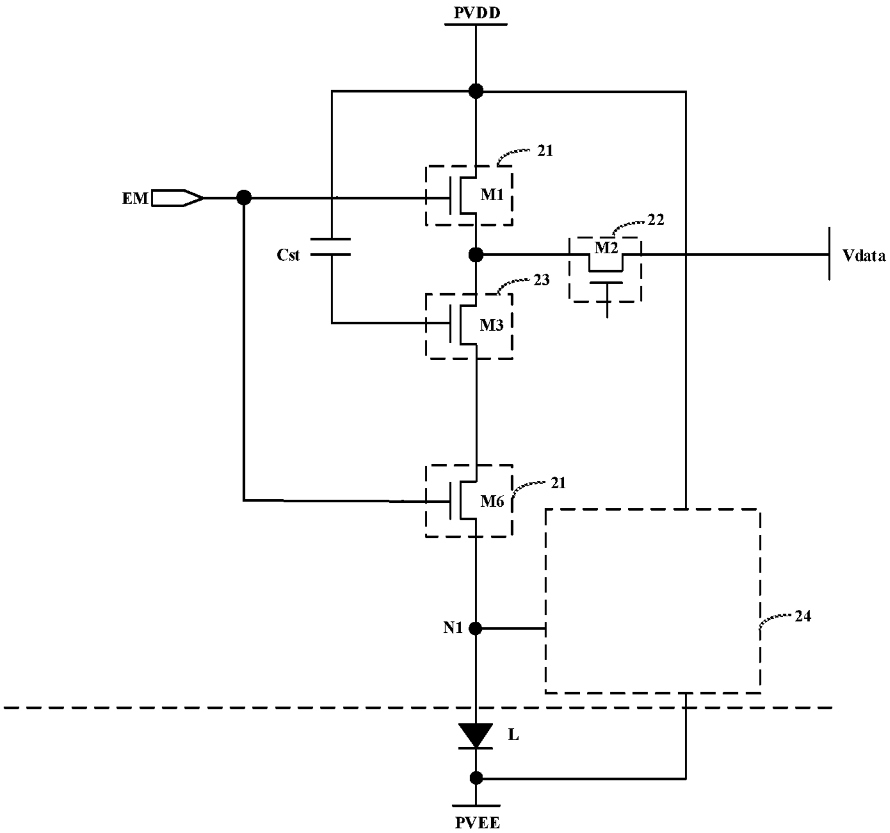
FIG. 2 shows a schematic structural diagram of a circuit of a pixel unit 10 according to an embodiment of the present application.

In order to solve the above technical problems, the embodiments of the present application provide a display panel and a display apparatus. The display panel according to the embodiments of the present application will be firstly described below FIGS. 1 and 2 show a schematic structural diagram of a display panel according to an embodiment of the present application. The display panel includes a plurality of pixel units 10 arranged in an array, and each of the pixel units 10 includes a pixel circuit 20 and a light emitting element L.

As shown in FIG. 2, the pixel circuit 20 includes a data writing module 22, a driving module 23, a light emitting control module 21 and a pre-charging module 24.

The data writing module 22 may be configured to provide a data signal to the driving module 23. The driving module 23 may be configured to provide a driving current to the light emitting element L to drive the light emitting element L to emit light. The light emitting control module 21 may be configured to selectively allow the light emitting element L to enter a light emitting stage.

In a non-light emitting stage of the light emitting element L, the pre-charging module 24 may be configured to increase a voltage of a first node N1 to a first voltage, the first node N1 is electrically connected between the light emitting control module 21 and the light emitting element L. The first voltage is less than a light emitting threshold voltage of the light emitting element L.

It may be understood that in the light emitting stage, the driving module 23 and the light emitting control module 21 in the pixel circuit 20 are turned on, and a power signal may be connected to anode of the light emitting element L to increase the potential of the anode of the light emitting element L. Since the initial potential of the anode of the light emitting element L is low, after the anode of the light emitting element L receives the power signal, the potential of the anode of the light emitting element L gradually increases until it reaches the light emitting threshold voltage, and then the light emitting element L can start emitting light. That is, the anode of the light emitting element L needs to be charged for a period of time in the light emitting stage, so that the potential of the anode reaches the light emitting threshold voltage of the light emitting element L and then to start emitting light.

The pre-charging module 24 can increase the voltage of the first node N1 in the non-light emitting stage, and since the first node N1 is connected to the light emitting control module 21 and the light emitting element L which is usually connected to the pixel circuit 20 through the anode, the voltage of the first node N1 is the voltage of the anode of the light emitting element L. The pre-charging module 24 increases the voltage of the first node N1 to the first voltage in the non-light emitting stage, which means that the anode of the light emitting element L is pre-charged in the non-light emitting stage, and that the voltage of the anode of the light emitting element L is increased to the first voltage. Since the first voltage is less than the light emitting threshold voltage of the light emitting element L, the light emitting element L will not emit light in the non-light emitting stage. After entering the light emitting stage, since currently the voltage of the anode of the light emitting element L is the first voltage, while the voltage of the anode without being pre-charged is less than the first voltage, at the beginning of the light emitting stage, the voltage of the anode of the light emitting element L is closer to the light emitting threshold voltage of the light emitting element L than the voltage of the anode without being pre-charged. When the light emitting element L receives the power signal, the charging time required for the potential of anode of the light emitting element L to increase from the first voltage to the light emitting threshold voltage is shorter than the charging time required for the potential of anode of the light emitting element L to increase from a lower voltage without being pre-charged to the light emitting threshold voltage. Therefore, by pre-charging the first node N1 using the pre-charging module 24 in the non-light emitting stage to increase the voltage of the first node N1, the charging time required for the potential of the anode of the light emitting element L to increase to the light emitting threshold voltage can be shortened, so that the light emitting element L starts emitting light earlier in the light emitting stage, thereby the light emitting duration of the light emitting element L in the light emitting stage is increased and the light emitting brightness in improved.

In the embodiment, the first node N1 is pre-charged by the pre-charging module 24 in the non-light emitting stage, and the voltage of the first node N1 can be increased to the first voltage, in which case the first voltage is less than the light emitting threshold voltage of the light emitting element L, the light emitting element L will not unexpectedly emit light. In the light emitting stage, the voltage of the anode of the light emitting element L can be increased from the first voltage to the light emitting threshold voltage when a power signal is received. After the first node N1 being pre-charged, the voltage magnitude required for the voltage of the anode of the light emitting element L to reach the light emitting threshold voltage is reduced, and therefore the time required for the voltage of the anode of the light emitting element L to reach the light emitting threshold voltage is shortened, so that the light emitting element L starts emitting light earlier in the light emitting stage, the light emitting brightness of the light emitting element L is improved and the problem of low brightness of the first frame when switching from low brightness to high brightness is alleviated.

It may be understood that when the display panel is switched from low brightness display to high brightness display, in the display process of the first image frame, the initial voltage of the anode of the light emitting element L is low, and in order to make the light emitting element L to emit light, the voltage of the anode of the light emitting element L needs to be increased to the light emitting threshold voltage under the power signal. Since the voltage of the anode of the light emitting element L needs a certain charging time to be increased, the light emitting element L does not emit light during this certain charging time, resulting in that the actual light emitting brightness is low. With the pre-charging of the pre-charging module 24 in the non-light emitting stage, the voltage of the anode of light emitting element L can be pre-increased to be closer to the light emitting threshold voltage, therefore the time required for the voltage of the anode of the light emitting element L to increase to the light emitting threshold voltage in the light emitting stage is shortened, and finally the light emitting brightness in the display of the first image frame is improved.

Figure 3:
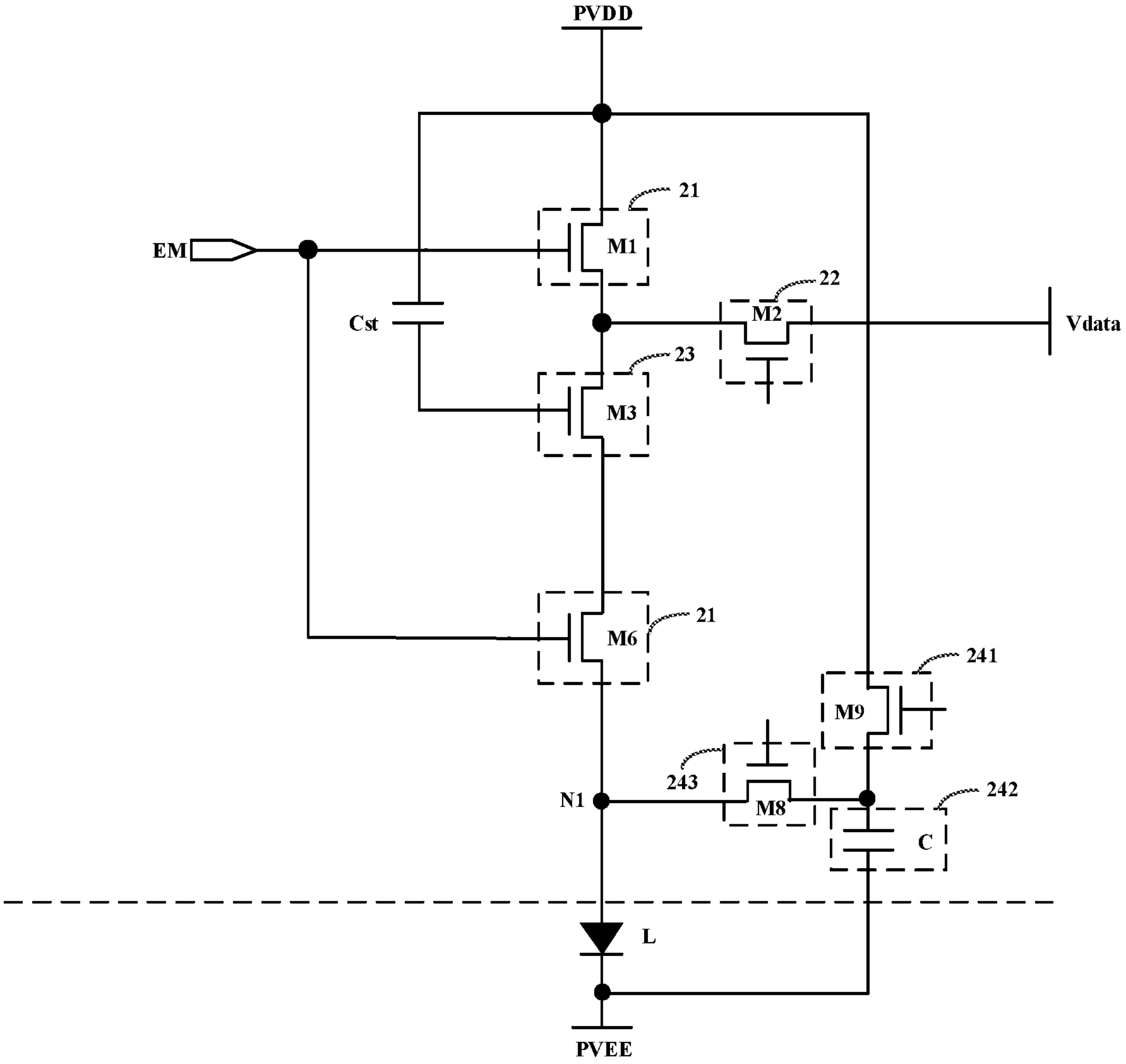
FIG. 3 shows a schematic structural diagram of a circuit of a pixel unit 10 according to another embodiment of the present application.

Referring to FIG. 3, in some embodiments, the pre-charging module 24 may include a charging unit 241, an energy storage unit 242 and a discharging unit 243.

A first end of the charging unit 241 is electrically connected to a first power signal line PVDD, a first end of the energy storage unit 242 is electrically connected to a second end of the charging unit 241, and a second end of the energy storage unit 242 is electrically connected to a second power signal line PVEE. A first end of the discharging unit 243 is electrically connected to the first end of the energy storage unit 242, and a second end of the discharging unit 243 is electrically connected to the first node N1.

The charging unit 241 is connected between the first power signal line PVDD and the first end of the energy storage unit 242, and when the charging unit 241 is turned on, the two ends of the energy storage unit 242 are connected to the first power signal line PVDD and the second power signal line PVEE, respectively, and the first power signal line PVDD and the second power signal line PVEE provide a first power signal and a second power signal, respectively, the energy storage unit 242 may be charged under the first power signal and the second power signal.

The discharging unit 243 is connected between the first node N1 and the first end of the energy storage unit 242, and when the discharging unit 243 is turned on, the two ends of the energy storage unit 242 are connected to the first node N1 and the second power signal line PVEE, respectively, in which case the energy storage unit 242 may be discharged for the first node N1 to increase the voltage of the first node N1.

It may be understood that the energy storage unit 242 may include an energy storage capacitor C. Since the voltage of the first power signal provided by the first power signal line PVDD is a fixed voltage, by adjusting the capacitance of the energy storage capacitor C, the pre-charge for the first node N1 may be adjusted, so that the voltage of the first node N1 is increased to the first voltage after the energy storage unit 242 discharges for the first node N1.

In some embodiments, in a single non-light emitting stage, an on-time period of the charging unit 241 does not overlap an on-time period of the discharging unit 243.

In a single non-light emitting stage, the charging unit 241 is firstly turned on to charge the energy storage unit 242, and then the discharging unit 243 is turned on to cause the energy storage unit 242 to be discharged for the first node N1. It may be understood that if the charging unit 241 and the discharging unit 243 are turned on simultaneously, the first power signal line PVDD is directly connected to the first node N1, in which case the voltage of the first node N1 is increased to a signal voltage of the first power signal. In order to enable the first power signal to drive the light emitting element L to emit light, the signal voltage of the first power signal needs to be set to greater than the light emitting threshold voltage of the light emitting element L, and if the first power signal line PVDD is directly connected to the first node N1, the voltage of the first node N1 will be increased to be greater than the light emitting threshold voltage, resulting in that the light emitting element L unexpectedly emits light in the non-light emitting stage. In order to avoid the unexpected light emitting of the light emitting element L in the non-light emitting stage, it should be set that the charging unit 241 and the discharging unit 243 will not be turned on simultaneously, that is, the on-time period of the charging unit 241 does not overlap the on-time period of the discharging unit 243.

As alternative implementation, in a single non-light emitting stage, the discharging unit 243 may be firstly turned on to release the charges stored by the energy storage unit 242 in a previous light emitting frame, so as to increase the voltage of the first node N1, and then the charging unit 241 is turned on to charge the energy storage unit 242 with the first power signal, so as to discharge the energy storage unit 242 in a next non-light emitting stage. Similarly, in order to avoid that the first power signal line PVDD is directly connected to the first node N1, in this discharging-before-charging approach, it may also be set that the charging unit 241 and the discharging unit 243 will not be turned on simultaneously.

Still referring to FIG. 3, in some embodiments, the charging unit 241 may include a charging transistor M9, the energy storage unit 242 may include an energy storage capacitor C, and the discharging unit 243 may include a discharging transistor M8.

A first terminal of the charging transistor M9 is electrically connected to the first power signal line PVDD, a second terminal of the charging transistor M9 is electrically connected to a first end of the energy storage capacitor C, a second end of the energy storage capacitor C is electrically connected to the second power signal line PVEE, a first terminal of the discharging transistor M8 is electrically connected to the first end of the energy storage capacitor C, and a second terminal of the discharging transistor M8 is electrically connected to the first node N1.

The charging transistor M9 may, when turned on, connect the first power signal line PVDD to the first end of the energy storage capacitor C, and when the two ends of the energy storage capacitor C are connected to the first power signal line PVDD and the second power signal line PVEE, respectively, the energy storage capacitor C may be charged under the first power signal and the second power signal. The discharging transistor M8 may, when turned on, connect the first node N1 to the first end of the energy storage capacitor C, and the energy storage capacitor C may be discharged through the first end to increase the voltage of the first node N1 to the first voltage.

In a single non-light emitting stage, the energy storage capacitor C may accumulate charges through the charging transistor M9 and release charges through the discharging transistor M8, so as to increase the voltage of the first node N1 through the first power signal provided by the first power signal line PVDD.

In some embodiments, the non-light emitting stage may include a pre-charging stage and a data writing stage.

In the pre-charging stage, the charging unit 241 may connect the first power signal line PVDD to the energy storage unit 242 to charge the energy storage unit 242 using the first power signal.

In the data writing stage, the discharging unit 243 may connect the energy storage unit 242 to the first node N1 to increase, after the energy storage unit 242 stores charges, the voltage of the first node N1 by releasing the charges.

When the pixel circuit 20 drives the light emitting element L to emit light, for example, in a single light emitting frame, the data writing module 22 may be turned on in the data writing stage of the non-light emitting stage to send the data signal to the driving module 23 for the charging in the data writing stage. It may be understood that in the data writing stage, the discharging unit 243 may be turned on to increase the voltage of the first node N1 by the discharging of the energy storage unit 242. That is, a control terminal of the data writing module 22 and a control terminal of the discharging unit 243 may be connected to the same control signal which may provide a turn-on signal in the data writing stage to turn on the data writing module 22 and the discharging unit 243.

It should be noted that in order to synchronously turn on the data writing module 22 and the discharging unit 243 in the data writing stage, the data writing module 22 and the discharging unit 243 may include the same type of transistors or may include different types of transistors. If the data writing module 22 and the discharging unit 243 include the same type of transistors, the control terminal of the data writing module 22 and the control terminal of the discharging unit 243 may be connected to the same control signal; and if the data writing module 22 and the discharging unit 243 include different types of transistors such as N-type transistors and P-type transistors, respectively, the control terminal of the data writing module 22 and the control terminal of the discharging unit 243 may be connected to two control signals with opposite enabling states, respectively, so that the data writing module 22 and the discharging unit 243 may be synchronously turned on or turned off.

Figure 4:
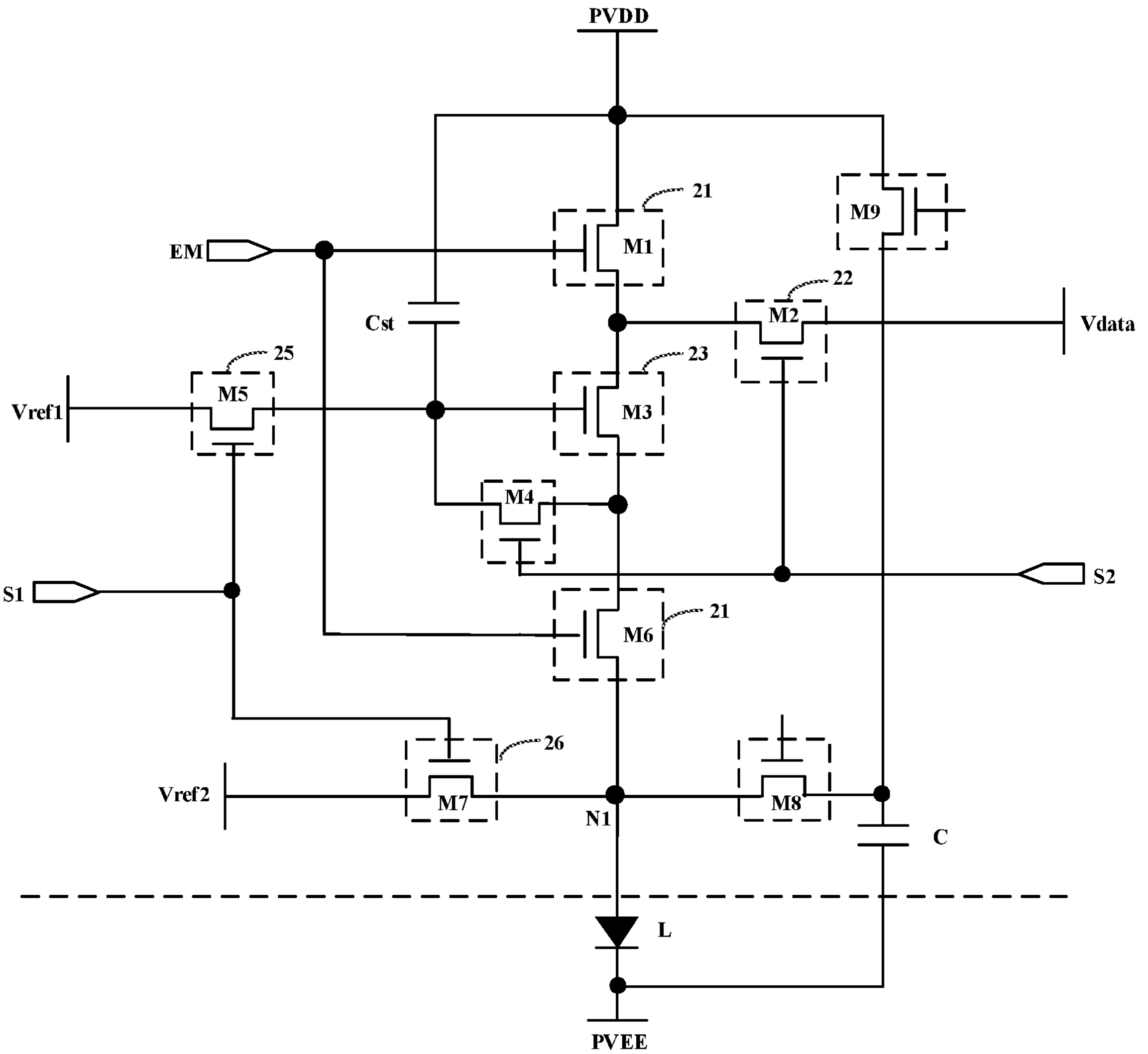
FIG. 4 shows a schematic structural diagram of a circuit of a pixel unit 10 according to yet another embodiment of the present application.

Referring to FIG. 4, in some embodiments, the pixel circuit 20 may further include a first initialization module 25 and a second initialization module 26.

The first initialization module 25 may initialize the driving module 23, and the second initialization module 26 may initialize the first node N1. After the first node N1 is initialized by the second initialization module 26, the voltage of the first node N1 is initialized as a second voltage less than the first voltage.

The above initialization process may be performed in an initialization stage of the non-light emitting stage. For example, in a single light emitting frame, the second initialization module 26 may initialize the voltage of the first node N1 as the second voltage in the initialization stage.

If the first node N1 is not pre-charged, in the light emitting stage, when the anode of the light emitting element L is connected to the first power signal line PVDD, the voltage of the first node N1 is increased from the second voltage until it reaches the light emitting threshold voltage, and then the light emitting element L starts emitting light.

However, after the first node N1 is pre-charged so that the voltage of the first node N1 is increased to the first voltage, the charging time required for the voltage of the first node N1 to increase to the light emitting threshold voltage in the light emitting stage can be shortened, i.e., the first voltage is closer to the light emitting threshold voltage than the second voltage. Since the voltage of the first node N1 is less than the light emitting threshold voltage in the non-light emitting stage, under a condition that the first voltage is closer to the light emitting threshold voltage, the first voltage is greater than the second voltage.

Figure 5:
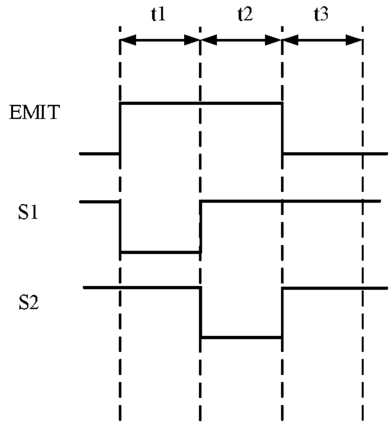
FIG. 5 shows a signal timing diagram of a single light emitting frame according to an embodiment of the present application.

It should be noted that the pixel circuit 20 may be consist of a first light emitting control transistor M1, a data writing transistor M2, a driving transistor M3, a compensation transistor M4, a first initialization transistor M5, a second light emitting control transistor M6, a second initialization transistor M7, and a storage capacitor Cst, as shown in FIGS. 4 and 5. A single light emitting frame includes a non-light emitting stage and a light emitting stage t3, and the non-light emitting stage may include an initialization stage t1 and a data writing stage t2.

In the initialization stage t1, the signal S1 is the enable signal, the first initialization transistor M5 is turned on, and the gate of the driving transistor M3 is initialized through the first initialization signal Vref1; and the second initialization transistor M7 is turned on, and the first node N1 is initialized through the second initialization signal Vref2.

In the data writing stage t2, the signal S2 is the enable signal, the data writing transistor M2 and the compensation transistor M4 are turned on, a data signal Vdata is sent to the gate of the driving transistor M3, and the storage capacitor Cst is charged.

In the light emitting stage t3, the signal EM is the enable signal, the first light emitting control transistor M1, the driving transistor M3, and the second light emitting control transistor M6 are turned on, the potential of the anode of the light emitting element L is increased until it reaches the light emitting threshold voltage, and then the light emitting element L starts emitting light.

Figure 6:
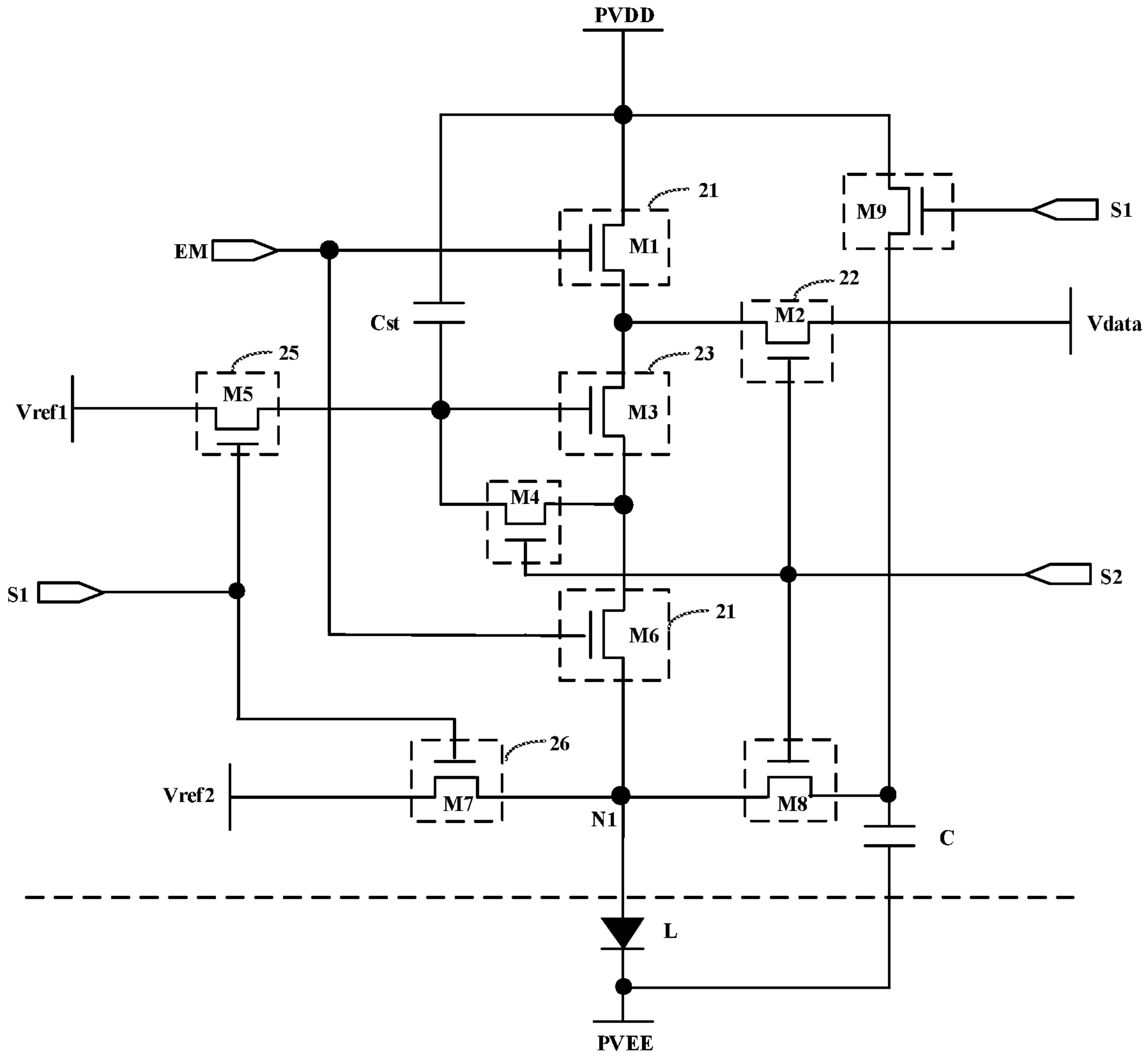
FIG. 6 shows a schematic structural diagram of a circuit of a pixel unit 10 according to yet another embodiment of the present application.

Referring to FIGS. 5 and 6 together, in some embodiments, a control end of the charging unit 241 is electrically connected to a control end of the second initialization module 26, and a control end of the discharging unit 243 is electrically connected to a control end of the data writing module 22.

The non-light emitting stage of a single light emitting frame as show in FIGS. 5 and 6 includes the initialization stage t1 and the data writing stage t2.

In the initialization stage t1, the first initialization module 25 may initialize the driving module 23, and the second initialization module 26 may initialize the first node N1. The control end of the charging unit 241 is electrically connected to the control end of the second initialization module 26, which means that the charging unit 241 receives the same control signal as the second initialization module 26. That is, the same control signal may control the second initialization module 26 to be turned on and control the charging unit 241 to be turned on at the same time, which means that the charging transistor M9 may connect the first power signal line PVDD to the energy storage unit 242 in the initialization stage t1 to charge the energy storage unit 242.

Similarly, the control end of the discharging unit 243 is electrically connected to the control end of the data writing module 22, which means that the discharging unit 243 receives the same control signal as the data writing module 22. That is, the discharging unit 243 may connect the first node N1 to the energy storage unit 242 in the data writing stage t2, and increase the voltage of the first node N1 to the first voltage by the discharging of the energy storage unit 242, which means that the discharging transistor M8 may connect the first node N1 to the energy storage unit 242 in the data writing stage t2 to increase the voltage of the first node N1.

In other optional implementation, the charging unit 241 and the second initialization module 26 may be controlled separately using different control signals, and the discharging unit 243 and the data writing module 22 may be controlled separately using different control signals. That is, the on-time period of the charging unit 241 may be coincided with the initialization stage t1, or partially overlap the initialization stage t1, or even be completely different from the initialization stage t1. Similarly, the on-time period of the discharging unit 243 may be coincided with the data writing stage t2, or partially overlap the data writing stage t2, or be completely different from the data writing stage t2.

In some embodiments, the plurality of pixel units 10 may include at least a first pixel unit, a second pixel unit and a third pixel unit, and the light emitting elements L of the first pixel unit, the second pixel unit and the third pixel unit emit lights of different colors.

The pixel circuit 20 of the first pixel unit may include the data writing module 22, the driving module 23 and the light emitting control module 21. The pixel circuit 20 of the second pixel unit may also include the data writing module 22, the driving module 23 and the light emitting control module 21. The pixel circuit 20 of the third pixel unit may also include the data writing module 22, the driving module 23 and the light emitting control module 21.

Color of light emitted by the light emitting element L of the first pixel unit may be green, and the pixel circuit 20 of the first pixel unit may further include the pre-charging module 24. That is, among the plurality of pixel units 10 emitting lights of different colors, the pixel circuit 20 of the pixel unit emitting light of green may include the pre-charging module 24 and increase the voltage of the first node N1 by the pre-charging module 24 to reduce the difference between the voltage of the first node N1 and the light emitting threshold voltage, so that the charging time required for the voltage of the first node N1 to increase to the light emitting threshold voltage in the light emitting stage is decreased, and the light emitting brightness of the pixel unit emitting light of green is improved. The pixel units 10 which emit lights of other colors do not include the pre-charging module 24, and thus cannot increase the voltage of the first node N1 in the non-light emitting stage.

It should be noted that since the light emitting materials, the light emitting areas and the light emitting threshold voltages of the light emitting elements L emitting lights of different colors are different, the charging times required for the voltage of the anode of the light emitting elements L emitting lights of different colors to increase from the voltage as initialized to the corresponding light emitting threshold voltage are also different. At present, the charging time required for the voltage of the anode of the light emitting element L emitting light of green to increase from the voltage as initialized to the corresponding light emitting threshold voltage is longer than the charging times required for the light emitting elements L emitting lights of other colors, resulting in that the light emitting period of the light emitting element L emitting light of green is short, and the color cast phenomenon occurs.

For example, the pixel units 10 may include pixel units emitting lights of green, blue and red, the time required for the light emitting element L of the pixel unit 10 emitting light of blue to increase from the initial voltage to the light emitting threshold voltage and the time required for the light emitting element L of the pixel unit 10 emitting light of red to increase from the initial voltage to the light emitting threshold voltage are short, therefore the light emitting element L emitting light of blue and the light emitting element L emitting light of red emit lights earlier than the light emitting element L emitting light of green, and the color cast phenomenon in which the brightness of the first frame is reddish and purplish occurs when the display panel switches from low brightness to high brightness. By setting that only the pixel circuit 20 of the pixel unit emitting light of green includes the pre-charging module 24, the voltage of the first node N1 may be increased by the pre-charging module 24, so that in the light emitting stage, the initial voltage of the pixel unit emitting light of green is increased to the first voltage which is closer to the light emitting threshold voltage. It may be understood that after the initial voltage of the pixel unit emitting light of green is increased by the pre-charging, the charging time required to increase to the light emitting threshold voltage in the light emitting stage is shortened, so that the light emitting element L emitting light of green can emit light earlier, the color cast phenomenon due to the short light emitting period of the light emitting element L emitting light of green is alleviated.

In some embodiments, colors of lights emitted by the light emitting elements L of the second pixel unit and the third pixel unit are red and blue, respectively. The pixel circuit 20 of the second pixel unit may include the pre-charging module 24, and the pixel circuit 20 of the third pixel unit may also include the pre-charging module 24.

When the display panel switches from low brightness to high brightness, the voltage of the anode of the light emitting elements L emitting lights of different colors needs a certain charging time to increase to the light emitting threshold voltage, and thus to start emitting light. That is, in the light emitting stage, the light emitting element L emitting light of each color cannot directly emit light, but need to go through a certain charging time to emit light. Therefore, the light emitting period of the light emitting element L emitting light of each color is less than the duration of the light emitting stage. In other words, when switching from low brightness to high brightness, the light emitting brightness of the light emitting element L emitting light of each color is decreased due to the shortening of the light emitting period, and thus the overall brightness of the first image frame displayed by the display panel is also dark. That is, both the color cast and darkness phenomenon exist in the first image frame.

In order to alleviate the darkness of the first frame when switching from low brightness to high brightness, the pre-charging module 24 may be provided in the pixel circuit 20 for all the pixel units 10 emitting lights of different colors, the first node N1 is pre-charged to reduce the voltage difference between the initial voltage of the first node N1 and the light emitting threshold voltage when the light emitting stage is entered, so as to shorten the charging time required for the voltage of the first node N1 to increase to the light emitting threshold voltage, so that all the light emitting elements L emitting lights of various colors can emit light earlier, the overall brightness of the first frame is improved and the darkness of the first frame is alleviated.

In some embodiments, for a plurality of pixel rows formed by the plurality of pixel units 10 arranged in an array, the number of pixel units 10 included in each pixel row may be j, which may be an integer greater than or equal to 1. Herein, the numbers of the pixel units 10 included in various pixel rows may be the same or different.

For example, for a single pixel row, in a pixel row including j pixel units 10, the pre-charging module 24 consisting of the discharging unit 243, the energy storage unit 242, and the charging unit 241 may be provided to pre-charge the j pixel units 10 in this pixel row in the non-light emitting stage.

Since one end of the discharging unit 243 is directly connected to the first node N1, if two or more light emitting elements L share the same discharging unit 243, the anodes of the two light emitting elements L are connected to the one end of the discharging unit 243, which means that the anodes of the two light emitting elements L are directly electrically connected, in which case the two light emitting elements L will be synchronously turned on or turned off, so as to produce the same light emitting brightness. That is, under a condition that a plurality of light emitting elements L share the same discharging unit 243, the light emitting brightness of the plurality of light emitting elements L are exactly the same.

In order to separately control the light emitting brightness of the various pixel units 10, the various pixel units 10 should be connected to the energy storage unit 242 through respective corresponding discharging units 243, so as to avoid the problem that the light emitting brightness cannot be separately controlled when more than two pixel units 10 share the same discharging unit 243. That is, when j pixel units 10 are included in a pixel row, j discharging units 243 may be provided accordingly so that the first node N1 of each of the pixel units 10 may be connected to the energy storage unit 242 through the corresponding discharging unit 243.

Since the discharging unit 243 is directly connected to the first node N1, in order to separately control the various pixel units 10, for a single pixel row, the same number of the discharging units 243 as the number of the pixel units 10 should be provided. For the charging unit 241 and the energy storage unit 242, each of the pixel units 10 may respectively correspond to a charging unit 241 and an energy storage unit 242, or a part of the pixel units 10 may share the same charging unit 241 and/or energy storage unit 242. Thus, under a condition that a single pixel row includes j pixel units 10, the number of the charging units 241 may be greater than or equal to 1 and less than or equal to j, and the number of the energy storage units 242 may also be greater than or equal to 1 and less than or equal to j.

As optional implementation, for example, a single pixel row includes 10 pixel units 10, i.e., j=10, the number of the discharging units 243 may be 10, the number of the charging units 241 may be from 1 to 10, and the number of the energy storage units 242 may also be from 1 to 10.

Under a condition that the number of the charging unit 241 is 1 and the number of the energy storage units 242 is 10, the first ends of the 10 energy storage units 242 may be electrically connected to the second end of the same charging unit 241, in which case the first ends of the 10 energy storage units 242 are electrically connected to each other. The 10 first nodes N1 corresponding to the 10 pixel units 10 may be electrically connected to the second end of the same charging unit 241 through 10 discharging units 243 respectively, in which case the first ends of the 10 discharging units 243 are electrically connected to each other.

Under a condition that the number of the charging units 241 is 2 and the number of the energy storage units 242 is 10, a part of the 10 energy storage units 242 may be electrically connected to the second end of one of the charging units 241, and the other part of the energy storage units 242 may be electrically connected to the second end of the other one of the charging units 241.

Under a condition that the number of the charging units 241 is 10 and the number of the energy storage unit 242 is 1, the first end of the energy storage unit 242 may be electrically connected to the second ends of the 10 charging units 241, in which case the second ends of the 10 charging units 241 are connected to each other. The 10 first nodes N1 may be electrically connected to the first end of the same energy storage unit 242 through 10 discharging units 243 respectively, in which case the first ends of the 10 discharging units 243 are electrically connected to each other.

Similarly, under a condition that the number of the charging units 241 is 10 and the number of the energy storage units 242 is 2, one of the energy storage units 242 may be electrically connected to the second ends of a part of the charging units 241, and the other one of the energy storage units 242 may be electrically connected to the second ends of the other part of the charging units 241.

As optional implementation, under a condition that the number of the charging units 241 is 10 and the number of the energy storage units 242 is 10, the first ends of the 10 energy storage units 242, the second ends of the 10 charging units 241, and the first ends of the 10 discharging units 243 may be connected together to a same common node. When the 10 charging units 241 are turned on, the 10 energy storage units 242 may be charged simultaneously through the common node; and when the 10 discharging units 243 are turned on, the 10 energy storage units 242 may be discharged simultaneously though the common node for the anodes of the light emitting elements L connected to the 10 discharging units 243.

As other optional implementation, under a condition that the number of the charging units 241 is 10 and the number of the energy storage units 242 is 10, the first ends of the 10 discharging units 243 may be connected to the first ends of the corresponding 10 energy storage units 242, respectively, and the first ends of the 10 energy storage units 242 may be connected to the second ends of the corresponding 10 charging units 241, respectively, in which case each of the pixel circuits includes one charging unit 241, one energy storage unit 242 and one discharging unit 243.

In some embodiments, the j pixel units 10 in the same pixel row may include j pixel circuits 20, one charging unit 241, j energy storage units 242, and j discharging units 243, in which each of the pixel circuits 20 includes one energy storage unit 242 and one discharging unit 243, and the j pixel circuits 20 share one charging unit 241. In this case, the single charging unit 241 may send, when turned on, the first power signal to the j energy storage units 242 simultaneously to charge the j energy storage units 242 simultaneously.

The first end of the charging unit 241 may be electrically connected to the first power signal line PVDD, and the j pixel circuits 20 located in the same pixel row are all electrically connected to the charging unit 241. For example, the first nodes N1 in the j pixel circuits 20 may be electrically connected to the charging unit 241 through the discharging units 243.

For the j energy storage units 242, the first end of each of the energy storage units 242 may be electrically connected to the second end of the same charging unit 241, and the second end of each of the energy storage units 242 may be connected to the second power signal line PVEE. When the charging unit 241 is turned on, each of the j energy storage units 242 may be charged under the driving of the first power signal and the second power signal.

The first end of each of the energy storage units 242 may also be electrically connected to the j pixel circuits 20 in the same pixel row, for example, the energy storage unit 242 may be connected to the pixel circuit 20 through the discharging unit 243.

For the j discharging units 243, the first end of each of the discharging units 243 may be electrically connected to the first end of the energy storage unit 242 in the corresponding pixel circuit, and the second end of each of the discharging units 243 may be electrically connected to the first node N1 of the corresponding pixel circuit 20.

It should be noted that since the j energy storage units 242 are electrically connected to the same charging unit 241, when the j discharging units 243 are connected to the j energy storage units 242, it means that the first ends of the j discharging units 243 and the first ends of the j energy storage units 242 are connected to a same common node.

In the embodiment, the single charging unit 241 may send, when turned on, the first power signal to the plurality of energy storage units 242 simultaneously to charge the energy storage units 242. Under a condition that each pixel row is provided with a single charging unit 241, the number of transistors required for arranging the charging unit 241 in the display panel can be reduced, so as to save the device cost and panel space for the display panel.

In some embodiments, the j pixel units 10 in the same pixel row may include j pixel circuits 20, j charging units 241, one energy storage unit 242, and j discharging units 243, in which each of the pixel circuits 20 includes one charging unit 241 and one discharging unit 243, and the j pixel circuits 20 share one energy storage unit 242. In this case, the single energy storage unit 242 may be charged when the charging units 241 are turned on and simultaneously discharged though the j discharging units 243 respectively when the discharging units 243 are turned on, so as to increase the voltage of the first nodes N1 of the j pixel circuits 20.

The first ends of the j charging units 241 are electrically connected to the first power signal line PVDD, and the first nodes N1 of the j pixel circuits 20 may be electrically connected to the corresponding charging unit 241 through the discharging units 243. The first end of the single energy storage unit 242 may be electrically connected to the second ends of the j charging units 241, the second end of the single energy storage unit 242 is electrically connected to the second power supply signal line PVEE, and the first nodes N1 of the j pixel circuits 20 may be electrically connected to the first end of the energy storage unit 242 through the discharging units 243.

Similar to the connections in the above embodiments with a single charging unit 241, in the embodiment, for the j pixel units 10 in the same row, only a single energy storage unit 242 may be provided for charging, and when the j discharging units 243 are turned on, the energy storage unit 242 may be discharged for the first nodes N1 of the j pixel units 10 simultaneously to increase the voltage of the j first nodes N1. Under a condition that each pixel row is provided with a single energy storage unit 242, the number of capacitors required for arranging the energy storage unit 242 in the display panel can be reduced, so as to save the device cost and panel space for the display panel.

In some embodiments, the j pixel units 10 in the same pixel row may include j pixel circuits 20, one charging unit 241, one energy storage unit 242, and j discharging units 243, in which each of the pixel circuits 20 includes one discharging unit 243, and the j pixel circuits 20 share one charging unit 241 and one energy storage unit 242. In this case, the single energy storage unit 242 may be charged when the single charging unit 241 is turned on, and discharged through the j discharging units 243 simultaneously when the discharging units 243 are turned on, so as to increase the voltage of the first nodes N1 of the j pixel circuits 20.

The first end of the charging unit 241 is electrically connected to the first power signal line PVDD, and the second end is connected to the first end of the energy storage unit 242. The second end of the energy storage unit 242 is connected to the second power supply signal line PVEE. The first nodes N1 of the j pixel circuits 20 may be electrically connected to the energy storage unit 242 and the charging unit 241 through the j discharging units 243.

In the embodiment, for the j pixel units 10 in the same row, only a single charging unit 241 and a single energy storage unit 242 may be provided for charging, and when the j discharging unit 243 are turned on, the energy storage unit 242 may be discharged for the first nodes N1 of the j pixel units 10 simultaneously to increase the voltage of the j first nodes N1. Under a condition that each pixel row is provided with a single charging unit 241 and a single energy storage unit 242, the number of transistors required for arranging the charging unit 241 and the number of capacitors required for arranging the energy storage unit 242 in the display panel can be reduced, so as to save the device cost and panel space for the display panel.

It should be noted that in the above various embodiments in which the j pixel units 10 in the same pixel row are driven, the first ends of the j discharging units 243 are connected to a common node whether a single charging unit 241 or a single energy storage unit 242 is provided. Therefore, when the energy storage unit 242 is discharged, the first voltage of the first node N1 of each of the pixel units 10 after being pre-charged is correlated with the capacitance of the energy storage unit 242 and the equivalent capacitance of the light emitting element L.

For the light emitting elements L emitting lights of different colors, the parameters such as the light emitting materials and the light emitting areas are different, resulting in that the equivalent capacitances of the light emitting elements L are not the same.

In optional implementation, for example, for the j pixel units 10 in a single pixel row, if all the j pixel units 10 include the light emitting elements L emitting lights of the same color, the equivalent capacitances of the various light emitting elements L may be considered as the same.

If the capacitances of the energy storage units 242 connected to the various pixel units 10 are the same, the first nodes N1 of the various pixel units 10 may reach the same first voltage after being pre-charged. That is, for the plurality of pixel units 10 emitting lights of the same color, by electrically connecting the various pixel units 10 to the same energy storage unit 242, or electrically connecting the various pixel units 10 to a plurality of energy storage units 242 with the same capacitance, respectively, the first nodes N1 of the various pixel units 10 may be increased to the same first voltage after being pre-charged, so that the voltage of the anodes of the light emitting elements L of the various pixel units 10 emitting lights of the same color may be increased from the same first voltage to the light emitting threshold voltage simultaneously and that the light emitting elements L synchronously emit light.

In other optional implementation, if the j pixel units 10 in a single pixel row include the light emitting elements L emitting lights of two or more colors, the equivalent capacitances of the light emitting elements L emitting lights of different colors are not the same.

If the various pixel units 10 are electrically connected to a plurality of energy storage units 242 with the same capacitance, respectively, since the first voltage of the first node N1 of the pixel unit 10 after being pre-charged is correlated with the capacitance of the energy storage unit 242 and the equivalent capacitance of the light emitting element L, for two pixel units 10 emitting lights of different colors, under a condition that the capacitances of the energy storage units 242 are the same and the equivalent capacitances of the light emitting elements L are different, the first voltages of the first nodes N1 of the two pixel units 10 after being pre-charged are also different.

If the various pixel units 10 are electrically connected to the same energy storage unit 242, when the discharging units 243 respectively corresponding to the various pixel units are turned on, which means that the first nodes N1 of the various pixel units are connected together to a same common node, the voltages of the first nodes N1 of the various pixel units remain the same during the discharging process of the energy storage unit 242. That is, for two pixel units emitting lights of different colors, when they are electrically connected to the same energy storage unit 242, the first nodes N1 of the two pixel units 10 may be increased to the same first voltage after being pre-charged.

It should be noted that the above embodiments in which the pixel units 10 emitting lights of different colors are connected to the same energy storage unit 242 can also alleviate the color cast and darkness phenomenon of the first frame when switching from low brightness to high brightness. This is because the voltage of the first nodes N1 of the two pixel units 10 after being pre-charged may be increased to be closer to the light emitting threshold voltage of the light emitting element L, the charging time required for the voltage of the anode of the light emitting element L to increase to the light emitting threshold voltage after the light emitting stage is entered is decreased, i.e., the light emitting period of the light emitting element L in the light emitting stage is increased, which means the brightness of the first frame is improved, and therefore the darkness of the first frame is alleviated.

Moreover, for the color cast phenomenon of the first frame, the two pixel units 10 emitting lights of green and red are used as an example. In the light emitting mode without pre-charging, for the light emitting element L emitting light of red and the light emitting element L emitting light of green, in the light emitting stage, the voltage of the anode of the light emitting element L needs to be increased from an initialization voltage to the light emitting threshold voltage, and since the voltage of the anode of the light emitting element L emitting light of red is increased faster that the voltage of the anode of the light emitting element L emitting light of green, the voltage of the anode of the light emitting element L emitting light of red will be first increased to the light emitting threshold voltage and the light emitting element L emitting light of red starts emitting light earlier that the light emitting element L emitting light of green, in which case a time difference Td1 exists between the time when the light emitting element L emitting light of red starts emitting light and the time when the light emitting element L emitting light of green starts emitting light.

However, in the light emitting mode with pre-charging, the voltage of the anodes of the light emitting element L emitting light of red and the light emitting element L emitting light of green may be increased to the same first voltage in the non-light emitting stage, that is, for the light emitting element L emitting light of red and the light emitting element L emitting light of green, in the light emitting stage, the voltage of the anode of the light emitting element L is increased from the first voltage, which is greater than the initialization voltage, to the light emitting threshold voltage, in which case the time difference between the time when the light emitting element L emitting light of red starts emitting light and the time when the light emitting element L emitting light of green starts emitting light is Td2.

Under a condition that the increasing rate of anode voltage of the light emitting element L emitting light of red and the light emitting element L emitting light of green remains unchanged, since the voltage of the anode after being pre-charged is increased compared with the initialization voltage, the voltage magnitude required to further increase to the light emitting threshold voltage is reduced, that is, the voltage increasing magnitude required for the initialization voltage to increase to the light emitting threshold voltage is greater than the voltage increasing magnitude required for the first voltage to increase to the light emitting threshold voltage. Under a condition that the required voltage increasing magnitude is less and the increasing rate of anode voltage of the two light emitting elements L remains unchanged, the time difference between the times when the two light emitting elements start emitting light is shortened, i.e., Td2<Td1. Under a condition the time difference between the times when the two light emitting elements start emitting light is shortened, the brightness difference between red and green in the first image frame can also be reduced, and therefore the color cast phenomenon of the first frame is alleviated.

In the above configuration in which a single charging unit 241 or a single energy storage unit 242 is provided, the j pixel units 10 may be selected to emit light of the same color. For example, under a condition that a same row includes 20 pixel units 10, 10 pixel units emitting lights of green and 10 pixel units emitting lights of red, the 10 pixel units emitting lights of green may be pre-charged with a configuration in which the pre-charging module 24 includes a single charging unit 241 or a single energy storage unit 242, and the 10 pixel units emitting lights of red are connected to another pre-charging module 24 to be pre-charged by the another pre-charging module 24.

It may be understood that, alternatively, the 10 pixel units emitting lights of green may be connected to a plurality of pre-charging modules 24. For example, three pre-charging modules 24 may be provided in the display panel to connect to 3 pixel units emitting lights of green, 3 pixel units emitting lights of green, and 4 pixel units emitting lights of green, respectively, so as to pre-charge the 10 pixel units emitting lights of green by the three pre-charging modules 24.

Figure 7:
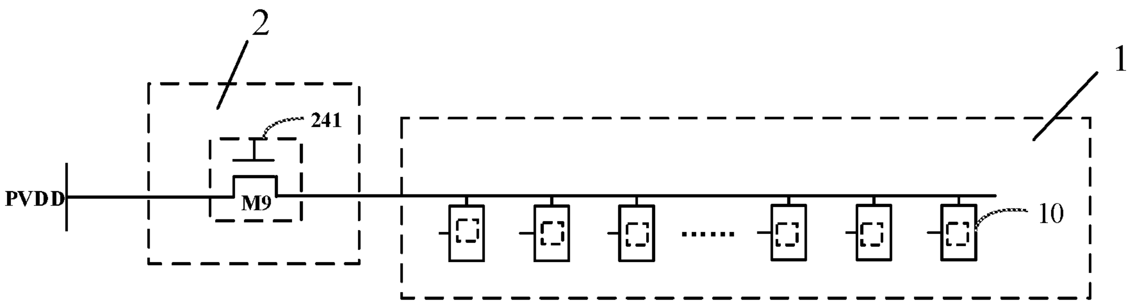
FIG. 7 shows a schematic structural diagram of a circuit in which a same pixel row shares one charging unit according to an embodiment of the present application.
Figure 8:
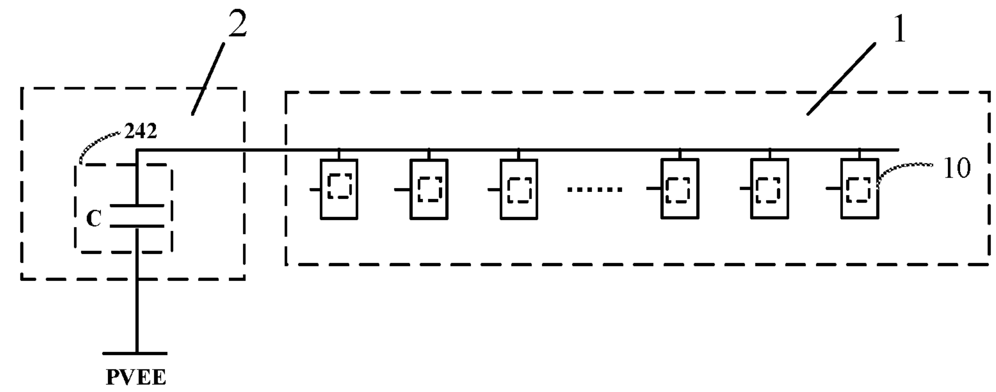
FIG. 8 shows a schematic structural diagram of a circuit in which a same pixel row shares one energy storage unit according to an embodiment of the present application.
Figure 9:
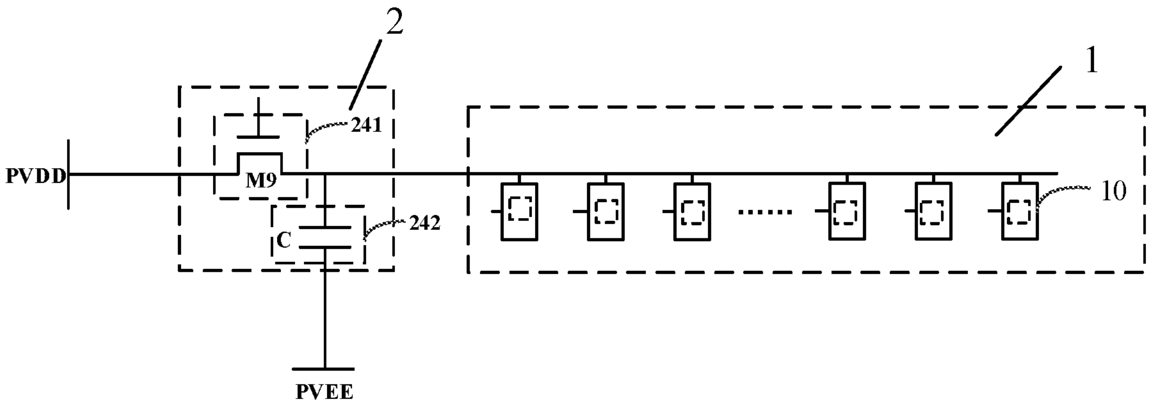
FIG. 9 shows a schematic structural diagram of a circuit in which a same pixel row shares one charging unit and one energy storage unit according to an embodiment of the present application.

Referring to FIGS. 7 to 9, in some embodiments, the display panel may include a display area 1 and a non-display area 2, the display area 1 may include the plurality of pixel units 10 arranged in an array, and the non-display area 2 may surround at least a part of the display area 1.

For a same pixel row, under a condition that one charging unit 241 or one energy storage unit 242 is provided, the charging unit 241 or the energy storage unit 242 may be arranged in the non-display area 2.

As shown in FIG. 7, under a condition that one charging unit 241 is provided, the charging unit 241 may be arranged in the non-display area 2, which means that a transistor is added as the charging transistor M9 of the charging unit 241 when the layout of devices for the non-display area 2 is designed. The transistor may be electrically connected to the energy storage units 242 and the discharging units 243 provided in the various pixel units 10 by extending signal routings.

As shown in FIG. 8, under a condition that one energy storage unit 242 is provided, the energy storage unit 242 may be arranged in the non-display area 2, which means that an energy storage capacitor C is added as the energy storage capacitor C of the energy storage unit 242 when the layout of the non-display area 2 is designed. The first end of the energy storage capacitor C may be electrically connected to the charging units 241 and the discharging units 243 provided in the various pixel units 10 by extending signal routings, and the second end of the energy storage capacitor C may be directly electrically connected to the second power signal line PVEE located in the non-display area 2.

As shown in FIG. 9, under a condition that one charging unit 241 and one energy storage unit 242 are provided, the charging unit 241 and the energy storage unit 242 may both be arranged in the non-display area 2, which means that a transistor and an energy storage capacitor C are added as the charging transistor M9 of the charging unit 241 and the energy storage capacitor C of the energy storage unit 242 when the layout of the non-display area 2 is designed. The common node of the charging unit 241 and the energy storage capacitor C may be electrically connected to the discharging units 243 provided in the various pixel units 10 by extending signal routings.

It should be noted that the above FIGS. 7 to 9 merely schematically illustrate the schematic structural diagram of the circuit in one of the plurality pixel rows in display area 1.

As an optional embodiment, under a condition that the charging unit 241 or the energy storage unit 242 is arranged in the non-display area 2, for example, for a single pixel row, the charging unit 241 or the energy storage unit 242 corresponding to the pixel row may be arranged close to a shift register unit corresponding to the pixel row.

In the non-display area 2, the shift register unit corresponding to each of the pixel rows is close to the various pixel units 10 in that pixel row, and the signal routing required for electrically connecting the shift register unit to the various pixel units 10 is short. Similarly, in order to reduce the length of signal routing between the charging unit 241 or the energy storage unit 242 and the discharging unit 243, the charging unit 241 or the energy storage unit 242 may be arranged close to the shift register unit. Moreover, since the charging unit 241 may receive a scanning signal provided by the shift register unit as a control signal, the length of the signal routing between the charging unit 241 and the shift register unit may also be reduced by arranging the charging unit 241 close to the shift register unit.

Figure 10:
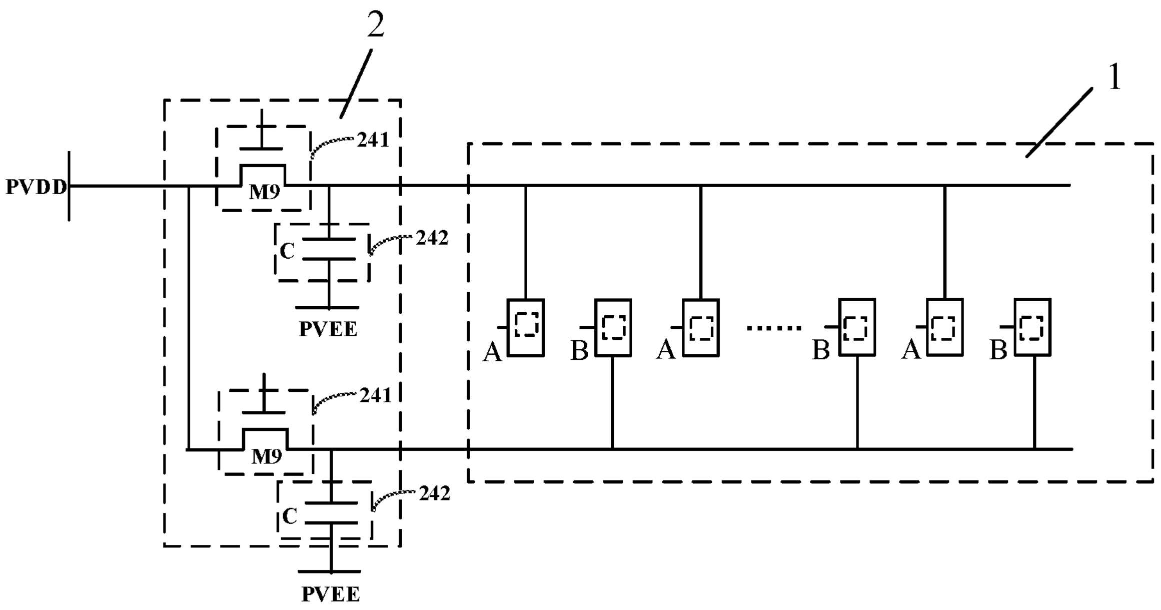
FIG. 10 shows a schematic structural diagram of a circuit in which a same row includes pixel units emitting lights of two colors according to an embodiment of the present application.

Referring to FIG. 10, in some embodiments, the display panel may include a display area 1 and a non-display area 2, the display area 1 may include the plurality of pixel units 10 arranged in an array, and the non-display area 2 may surround at least a part of the display area 1.

For a same pixel row, the plurality of pixel units 10 located in the same row may include pixel units 10 emitting lights of at least two colors.

Under a condition the plurality of pixel units 10 in a same row includes pixel units 10 emitting lights of a plurality of colors, the number of the energy storage units 242 provided correspondingly for the pixel units 10 in that row should be at least the same as the number of colors of the emitted light. That is, under a condition that the same row includes pixel units 10 emitting lights of two colors, at least two energy storage units 242 should be provided, and the first nodes N1 of the pixel units 10 emitting lights of the same color are connected to the same energy storage unit 242 through the corresponding discharging unit 243.

As shown in FIG. 10, the same pixel row includes pixel units 10 emitting lights of two colors, i.e., pixel units A and pixel units B. The non-display area 2 includes two charging units 241 and two energy storage units 242, the various pixel units A may be connected to one of the charging units 241 and one of the energy storage units 242, and the various pixel units B may be connected to the other of the charging units 241 and the other of the energy storage units 242.

It may be understood that under a condition that the number of the energy storage units 242 is the same as the number of colors of the emitted light, the pixel units 10 emitting lights of the same color are necessarily connected to the same energy storage unit 242, while under a condition that the number of the energy storage units 242 is greater than the number of colors of the emitted light, the pixel units 10 emitting lights of the same color may be connected to different energy storage units 242, but a single energy storage unit 242 can only be connected to the pixel units 10 emitting lights of one color. For example, under a condition that the same row includes 10 pixel units emitting lights of green and 10 pixel units emitting lights of red and the number of the energy storage units 242 is 3, the 10 pixel units emitting lights of red may be connected to one of the energy storage units 242, 4 pixel units emitting lights of green of the 10 pixel units emitting lights of green may be connected to a second one of the energy storage units 242, and the remaining 6 pixel units emitting lights of green may be connected to a third one of the energy storage units 242.

In some embodiments, for a same pixel row, under a condition that a plurality of pixel units 10 emitting lights of the same color are connected to the same energy storage unit 242, i.e., the plurality of pixel units 10 emitting lights of the same color share the same energy storage unit 242, the energy storage unit 242 may be arranged in the non-display area 2 and close to the shift register unit corresponding to the pixel row.

In exemplary implementation in which the same pixel row includes pixel units 10 emitting lights of two colors and two energy storage units 242 are provided, the two energy storage units 242 may be arranged in the non-display area 2 for the row, which means that two energy storage capacitors C are added as the energy storage capacitors C of the energy storage units 242 when the layout of the non-display area 2 is designed.

In order to avoid that the border area of the display panel is too wide, the number of the energy storage capacitors C that can be added into the non-display area 2 is limited. Therefore, under a condition that the number of the energy storage units 242 corresponding to a same pixel row is less, such as 2-4, the energy storage units 242 may be arranged in the non-display area 2. If the number of the energy storage units 242 corresponding to the same pixel row is further increased, the energy storage units 242 may be arranged within the pixel circuits 20 of the various pixel units 10 or between the various pixel units 10, so as to avoid the border width being affected by the large area of the non-display area 2.

Figure 11:
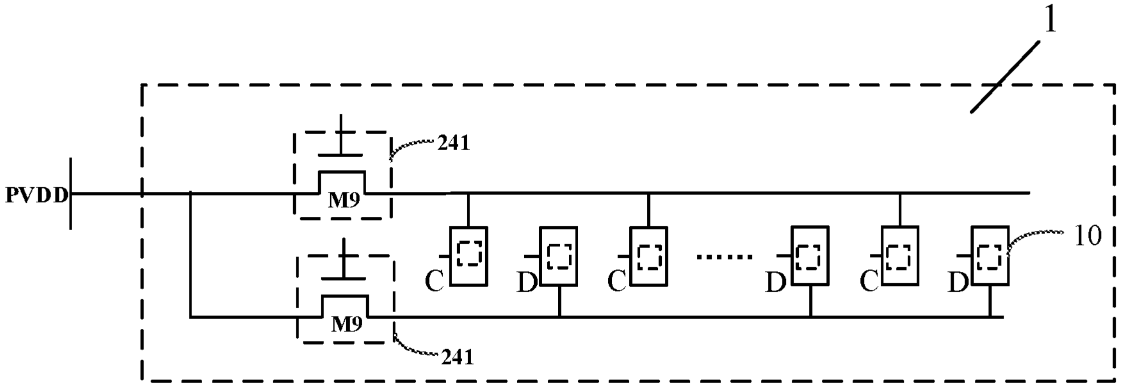
FIG. 11 shows a schematic structural diagram of a circuit in which a same row includes pixel units emitting lights of two or more colors according to another embodiment of the present application.
Figure 12:
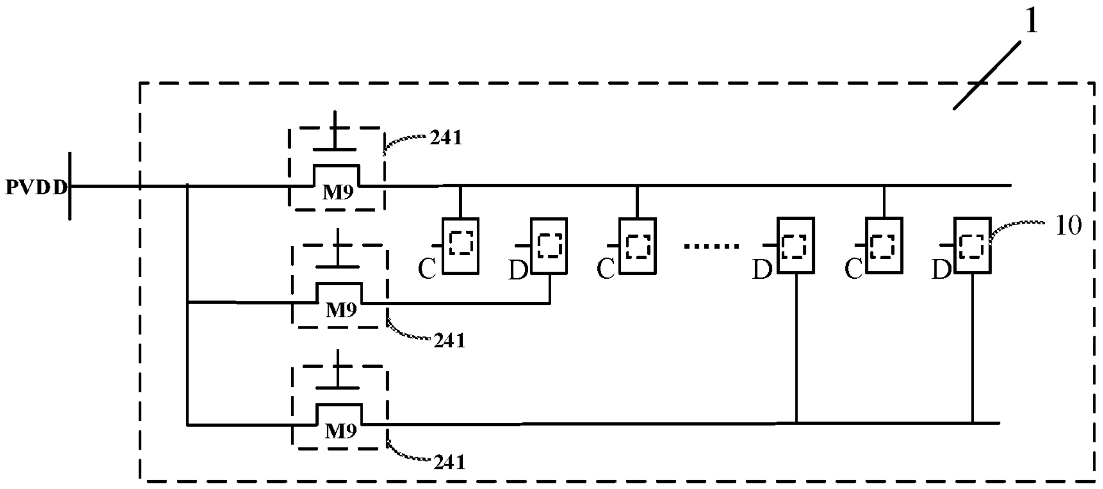
FIG. 12 shows a schematic structural diagram of a circuit in which a same row includes pixel units emitting lights of two or more colors according to yet another embodiment of the present application.

Referring to FIGS. 11 and 12, in some embodiments, for a same pixel row, under a condition that the number of the charging units 241 is greater than or equal to the number of colors of light emitted by the pixel units 10, the charging units 241 may be arranged in the display area 1.

In optional implementation, as shown in FIG. 11, the same pixel row includes pixel units 10 emitting lights of two colors, i.e., pixel units C and pixel units D, and for the pixel row, the number of the charging units 241 provided correspondingly is 2, which is the same as the number of colors of light emitted by the pixel row, in which case the two charging units 241 may be arranged in the display area 1 of the display panel.

It may be understood that FIG. 11 merely schematically illustrates the location of the various charging units 241, for example, the plurality of charging units 241 may be arranged between the edge of the display area 1 and the first pixel unit 10 in the pixel row. In other implementation, the charging units 241 may be arranged between the various pixel units 10, which is not limited herein.

As optional implementation, the number of the charging units 241 provided correspondingly in a same pixel row may be greater than the number of colors of light emitted by the pixel row. As shown in FIG. 12, for the pixel row, the number of the charging units 241 provided correspondingly is 3, which is greater than the number of colors of light emitted by the pixel row, in which case the three charging units 241 may be arranged in the display area 1 of the display panel.

As optional implementation, under a condition that the same pixel row includes pixel units 10 emitting lights of three colors, if the number of the charging units 241 provided correspondingly in the pixel row is greater than or equal to 3, the plurality of charging units 241 may be arranged in the display area 1 of the display panel. Similarly, under a condition that the number of colors of light emitted by the same pixel row is four or more, if the number of the charging units 241 provided correspondingly in the pixel row is greater than or equal to the number of colors of the emitted light, the plurality of charging units 241 may be arranged in the display area 1 of the display panel.

It may be understood that the pixel units 10 emitting lights of different colors in the same pixel row are connected to different energy storage units 242 to avoid the case in which, when the pixel units 10 emitting lights of different colors are connected to the same energy storage unit 242, the voltage increasing magnitudes of the first nodes N1 are different due to the different equivalent capacitances of the light emitting elements L. Therefore, when a plurality of energy storage units 242 are arranged for the pixel units 10 emitting lights of different colors, the energy storage units 242 need to be respectively connected to a plurality of charging units 241 to avoid that the various energy storage units 242 are connected to each other. That is, the number of charging units 241 should be at least the same as the number of energy storage units 242. Therefore, similarly, in order to avoid the border width being affected by the excessively added transistors in the non-display area 2, the charging units 241 may be arranged within the pixel circuits 20 of the various pixel units 10 in the display area 1, or between the various pixel units 10.

As optional implementation, under a condition that the number of the charging units 241 is the same as the number of colors of light emitted by the pixel units 10 in the row, the charging units 241 may be arranged in the non-display area 2, and under a condition that the number of the charging units 241 is greater than or equal to the number of colors of the emitted light, the charging units 241 may be arranged in the display area 1. That is, under a condition that the number of the charging units 241 is the same as the number of colors of light emitted by the pixel units 10 in the row, the charging units 241 may be arranged in the display area 1 or the non-display area 2, which is not limited herein.

In some embodiments, the plurality of light emitting elements L in the display panel may include at least a first light emitting element L and a second light emitting element L emitting lights of different colors.

The energy storage unit 242 may include a first energy storage capacitor C1 corresponding to the first light emitting element L and a second energy storage capacitor C2 corresponding to the second light emitting element L. That is, the anode of the first light emitting element L may be connected to the first energy storage capacitor C1 through the discharging unit 243, and the anode of the second light emitting element L may be connected to the second energy storage capacitor C2 through the discharging unit 243.

Since the equivalent capacitance of the first light emitting element L and the equivalent capacitance of the second light emitting element L are different, in order to separately pre-charge the light emitting elements L emitting lights of two colors, the capacitances of the first energy storage capacitor C1 and the second energy storage capacitor C2 may be set to be different, i.e., C1≠C2.

By adjusting the capacitance of the first energy storage capacitor C1, the voltage of the first node N1 after being pre-charged may be indirectly adjusted, i.e., the voltage of the anode of the first light emitting element L is adjusted. Similarly, the voltage of the anode of the second light emitting element L may be adjusted by adjusting the capacitance of the second energy storage capacitor C2. By adjusting the first energy storage capacitor C1 and the second energy storage capacitor C2, the voltage of the anode of the first light emitting element L and the voltage of the anode of the second light emitting element L may be increased, the charging time required for the voltage of the anode of the first light emitting element L to increase to the light emitting threshold voltage in the light emitting stage and the charging time required for the voltage of the anode of the second light emitting element L to increase to the light emitting threshold voltage in the light emitting stage are shortened, and thus the brightness of the first frame when switching from low brightness to high brightness is improved. Moreover, by setting the capacitances of the first energy storage capacitor C1 and the second energy storage capacitor C2, the first voltage of the first node N1 of the first light emitting element L after being increased and the first voltage of the first node N1 of the second light emitting element L after being increased may also be adjusted, so that the charging time required for the voltage of the first node N1 of the first light emitting element L to increase to the light emitting threshold voltage and the charging time required for the voltage of the first node N1 of the second light emitting element L to increase to the light emitting threshold voltage are the same, and that the first light emitting element L and the second light emitting element L may start emitting light at the same time, therefore, the color cast phenomenon due to the different light emitting starting times of the light emitting elements L emitting lights of different colors is alleviated.

It may be understood that since the charging time required for the first light emitting element L and the charging time required for the second light emitting element L are not the same, the first light emitting element L and the second light emitting element L will emit light successively. By adjusting the capacitances of the first energy storage capacitor C1 and the second energy storage capacitor C2 so that the charging time required for the first light emitting element L and the charging time required for the second light emitting element L are exactly the same, the first light emitting element L and the second light emitting element L will emit light at the same time, the color cast phenomenon due to the successive light emitting is eliminated. However, in the actual debugging process, the charging time of the first energy storage capacitor C1 and the charging time of the second energy storage capacitor C2 may not be exactly the same by adjusting the capacitances of the first energy storage capacitor C1 and the second energy storage capacitor C2, and a certain time difference still exists, in which case the first light emitting element L and the second light emitting element L still emit light successively, but the time interval between the successive light emitting of the two light emitting elements L will be shortened. It may be understood that the color cast phenomenon due to the successive light emitting of the two light emitting elements L can also be alleviated by shortening the time interval between the successive light emitting of the two light emitting elements L.

Figure 13:
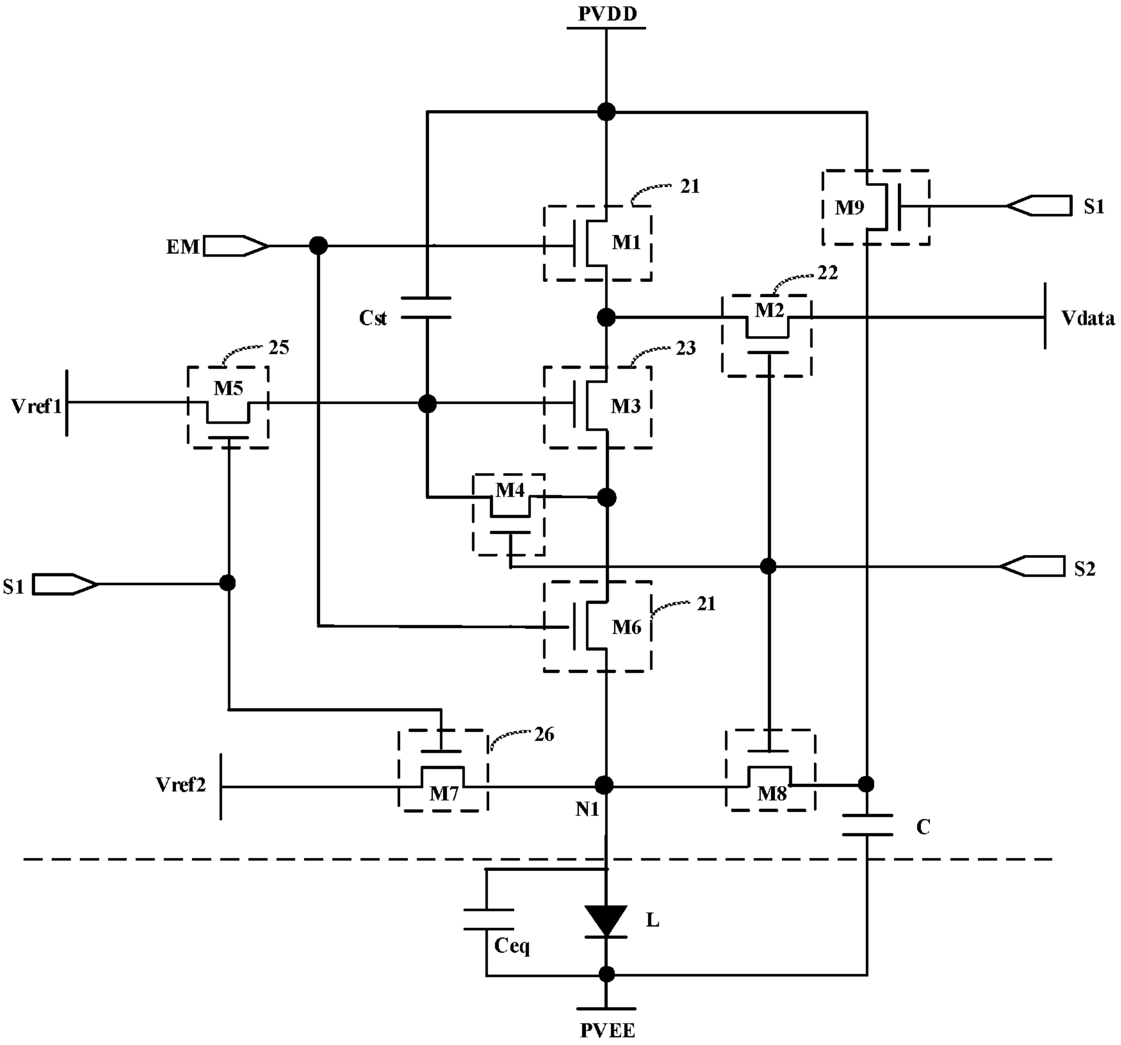
FIG. 13 shows a schematic structural diagram of a circuit of a pixel unit 10 according to yet another embodiment of the present application.

Referring to FIG. 13, in some embodiments, the equivalent capacitance of the first light emitting element L is Ceq1 and the equivalent capacitance of the second light emitting element L is Ceq2, and the capacitances of the first energy storage capacitor C1 and the second energy storage capacitor C2 may be set according to Ceq1 and Ceq2 so that C1/Ceq1≠C2/Ceq2.

It may be understood that under a condition that the voltage of the first node N1 as initialized and the signal voltage of the first power signal remains unchanged, the first voltage of the first node N1 after being pre-charged is correlated with the energy storage capacitor C and the equivalent capacitance of the light emitting element L. For example, for light emitting elements L emitting lights of different colors, under a condition that ratios of the energy storage capacitor C to the equivalent capacitance of the light emitting element L are the same, the first voltages of the first nodes N1 after being pre-charged are also the same. For example, for the first light emitting element L and the second light emitting element L, under a condition that C1/Ceq1=C2/Ceq2, the voltage of the first node N1 of the first light emitting element L after being pre-charged and the voltage of the first node N1 of the second light emitting element L after being pre-charged still remain the same.

However, in the original pixel circuit 20, the voltage of the first node N1 of the first light emitting element L and the voltage of the first node N1 of the second light emitting element L after being initialized should both be the signal voltage of the initialization signal. That is, the voltages of the first nodes N1 of the first light emitting element L and the second light emitting element L are the same even if the first light emitting element L and the second light emitting element L are not pre-charged. Therefore, the reason for the color cast phenomenon of the display panel is that the increasing rates of the voltages of different light emitting elements L are different when the light emitting elements L are connected to the first power signal. For example, for the light emitting element L emitting light of red and the light emitting element L emitting light of green, if they are not pre-charged, the initial voltages of the two light emitting elements L in the light emitting stage are the initialization voltage. Since the increasing rate of the voltage of the light emitting element L emitting light of red is greater, the voltage of the anode of the light emitting element L emitting light of red reaches the light emitting threshold voltage earlier, i.e., the light emitting element L emitting light of red starts emitting light earlier, resulting in the color cast phenomenon.

It may be understood that under a condition that C1/Ceq1=C2/Ceq2, the voltages of the first nodes N1 of the two light emitting elements L after being pre-charged are still the same, if the increasing rates of the voltages of the two light emitting elements L are different, one of the light emitting elements L will emit light earlier, resulting in the color cast phenomenon. Therefore, in order to avoid that one of the light emitting elements L emits light earlier, the capacitances of the first energy storage capacitor C1 and the second energy storage capacitor C2 should be set according to the equivalent capacitance Ceq1 of the first light emitting element L and the equivalent capacitance Ceq2 of the second light emitting element L, so that C1/Ceq1≠C2/Ceq2. In this case, the initial voltages of the two light emitting elements L after being pre-charged are not the same, and by adjusting the capacitances of the first energy storage capacitor C1 and the second energy storage capacitor C2, the voltage difference between the initial voltage of the light emitting element L with a greater increasing rate of voltage and the light emitting threshold voltage may be greater, so that the voltages of the anodes of the two light emitting elements L may reach the light emitting threshold voltage at the same time, that is, the two light emitting elements L may start emitting light at the same time, so as to alleviate the color cast phenomenon.

As shown in FIG. 13, in a single light emitting frame, in the initialization stage of the non-light emitting stage, the second initialization transistor M7 is turned on to initialize the voltage of the first node N1 as Vref2, while the charging transistor M9 is turned on so that the voltage difference between the two ends of the energy storage capacitor C is increased to PVDD; and in the data writing stage of the non-light emitting stage, the discharging transistor M8 is turned on, and the energy storage capacitor C is discharged for the first node N1 to increase the voltage of the first node N1 from Vref2 to the first voltage, which may be calculated by the following equation:

$$(Ceq*Vref2+C*PVDD)/(Ceq+C),$$

in which Ceq is the equivalent capacitance of the light emitting element L, and C is capacitance of the energy storage capacitor C.

In the light emitting stage, the voltage of the first node N1 is continuously increased from the first voltage, and the light emitting element L starts emitting light when the voltage of the first node N1 reaches the light emitting threshold voltage.

In some embodiments, the colors of lights emitted by the first light emitting element L and the second light emitting element L may be any two of red, green and blue.

Under a condition that the colors of lights emitted by the light emitting elements L in the display panel include red, green and blue, the light emitting elements L emitting lights of two of the colors may be used as the first light emitting element L and the second light emitting element L, and the capacitances of the first energy storage capacitor C1 and the second energy storage capacitor C2 may be set according to the equivalent capacitance Ceq1 of the first light emitting element L and the equivalent capacitance Ceq2 of the second light emitting element L, so that C1/Ceq1≠C2/Ceq2. For the light emitting elements L emitting lights of red, green and blue in the display panel, under a condition that the light emitting elements L emitting lights of any two of the colors satisfy C1/Ceq1≠C2/Ceq2, the ratios of the energy storage capacitor C to the equivalent capacitance of light emitting element L corresponding to the light emitting elements L emitting lights of the three colors are different from each other.

In some embodiments, the increased voltage of the first node N1 of the first light emitting element L after being pre-charged is V1 and the increased voltage of the first node N1 of the second light emitting element L after being pre-charged is V2, and the first energy storage capacitor C1 and the second energy storage capacitor C2 are set so that V1≠V2.

In the analysis of the above embodiments, for two light emitting elements L emitting lights of different colors without being pre-charged, their initial voltages in the light emitting stage are the same, i.e., the signal voltage of the initialization signal, Vref2. However, since the increasing rates of anode voltage of different light emitting elements L are different, the light emitting element L emitting light of a certain color will reach the light emitting threshold voltage earlier and emit light, resulting in the color cast phenomenon. Therefore, if the first energy storage capacitor C1 and the second energy storage capacitor C2 are set so that V1=V2, since the increasing rates of anode voltage of the two light emitting elements L are different, the times reaching the light emitting threshold voltage are still different, that is, the color cast phenomenon still exists.

In order to alleviate the color cast phenomenon due to the successive light emitting of different light emitting elements L, the first energy storage capacitor C1 and the second energy storage capacitor C2 may be set so that V1≠V2. By adjusting the first energy storage capacitor C1 and the second energy storage capacitor C2, the voltage of the first node N1 of the light emitting element L with a greater increasing rate of anode voltage after being increased may be lower, and the voltage of the first node N1 of the light emitting element L with a less increasing rate of anode voltage after being increased may be higher. In this case, the initial voltage of the light emitting element L with a greater increasing rate of anode voltage in the light emitting stage is lower, and the initial voltage of the light emitting element L with a less increasing rate of anode voltage in the light emitting stage is higher, after the two light emitting elements L are charged for the same or similar charging time, the voltages of anode may reach the light emitting threshold voltage at the same time, so that the two light emitting elements L emit light at the same time, the color cast phenomenon is alleviated.

In some embodiments, the first energy storage capacitor C1 and the second energy storage capacitor C2 may be set so that V1>V2. Herein, the color of light emitted by the first light emitting element L may be green, and the color of light emitted by the second light emitting element L may be red or blue.

The increasing rate of anode voltage of the light emitting element L emitting light of green is less, and in the light emitting stage, the light emitting element L emitting light of green needs a longer charging time to increase the voltage of anode to the light emitting threshold voltage and start emitting light, in which case the light emitting element L emitting light of red and the light emitting element L emitting light of blue have been emitting light for a period of time, resulting in the color cast phenomenon in the display panel. In order to shorten the charging time of the light emitting element L emitting light of green so that the light emitting element L emitting light of green can emit light earlier to alleviate the color cast phenomenon, the first energy storage capacitor C1 and the second energy storage capacitor C2 may be adjusted so that the voltage V1 of the first node N1 of the light emitting element L emitting light of green after being pre-charged is greater, in which case V1 is closer to the light emitting threshold voltage, the charging time of the light emitting element L emitting light of green can be shortened.

Similarly, for the light emitting element L emitting light of red and the light emitting element L emitting light of blue, the increasing rate of anode voltage of the light emitting element L emitting light of red is less, that is, if the initial voltages are the same, the light emitting element L emitting light of blue emits light earlier. Therefore, under a condition that the first light emitting element L emits light of red and the second light emitting element L emits light of blue, the first energy storage capacitor C1 and the second energy storage capacitor C2 may be adjusted so that the voltage of the first node N1 of the light emitting element L emits light of red is closer to the light emitting threshold voltage, so as to shorten the charging time of the light emitting element L emits light of red.

Under a condition that the display panel includes the light emitting element L emitting light of red, the light emitting element L emitting light of green, and the light emitting element L emitting light of blue, the capacitances of the energy storage capacitors C corresponding to different light emitting elements L may be set respectively so that after the pre-charging, the voltage of the first node N1 of the light emitting element L emitting light of green is closest to the light emitting threshold voltage and that the voltage of the first node N1 of the light emitting element L emitting light of blue is farthest from the light emitting threshold voltage. In the light emitting stage, the light emitting element L emitting light of red, the light emitting element L emitting light of green, and the light emitting element L emitting light of blue may reach the light emitting threshold voltage at the same time under different initial voltages and different increasing rates of anode voltage, so as to start emitting light at the same time, the color cast phenomenon due to early light emitting of some of the light emitting elements L is alleviate.

Figure 14:
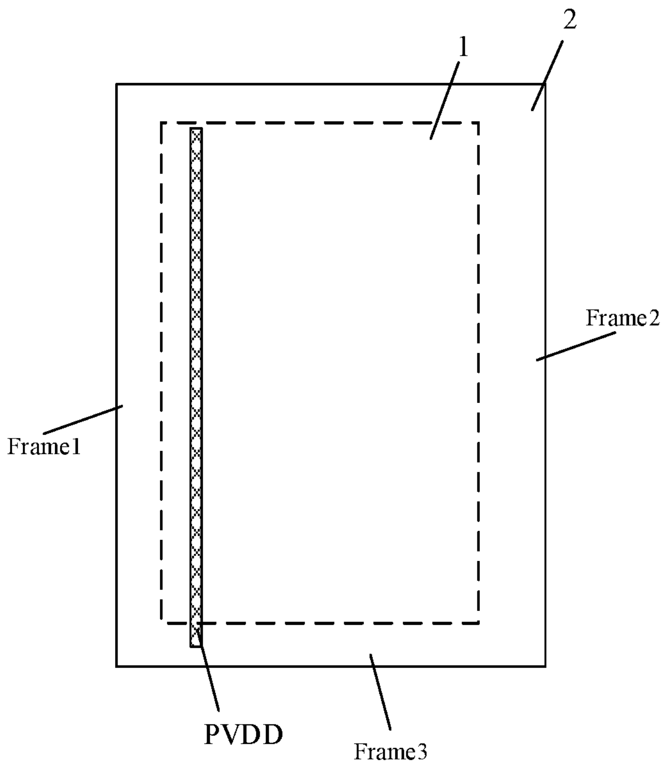
FIG. 14 shows a schematic diagram of the wiring of a first power signal line according to an embodiment of the present application.

Referring to FIG. 14, in some embodiments, the display panel may include a display area 1 and a non-display area 2. The non-display area 2 may include a first side frame area Frame1 and a second side frame area Frame2 opposite to each other, and a third side frame area Frame3 adjacent to the first side frame area Frame1 and the second side frame area Frame2.

The display panel may further include the first power signal line PVDD, at least part of the first power signal line PVDD is located in the third side frame area Frame3, and the first power signal line PVDD may extend from the third side frame area Frame3 to the display area 1 and be electrically connected to the various pixel circuits 20 within the display area 1 to provide the first power signal to the light emitting elements L through the various pixel circuits 20.

It should be noted that FIG. 14 schematically shows only one first power signal line PVDD extending from the non-display area 2 to the display area 1. There may be a plurality of first power signal lines PVDD extending to the display area 1 to provide the first power signal to the various pixel circuits 20 within the display area 1.

Under a condition that the charging unit 241 is arranged in the display area 1 and the first power signal line PVDD extends from the third side frame area Frame3 to the display area 1, the first end of the charging unit 241 may be electrically connected to the first power signal line PVDD within the display area 1 through signal routings.

Figure 15:
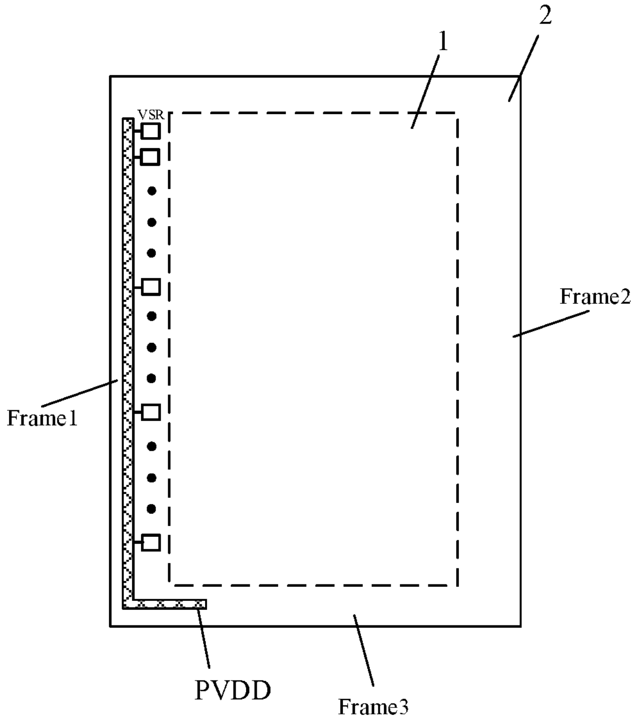
FIG. 15 shows a schematic diagram of the wiring of a first power signal line according to another embodiment of the present application.

Referring to FIG. 15, in some embodiments, the display panel may include a display area 1 and a non-display area 2. The non-display area 2 may include a first side frame area Frame1 and a second side frame area Frame2 opposite to each other, and a third side frame area Frame3 adjacent to the first side frame area Frame1 and the second side frame area Frame2.

The display panel may further include the first power signal line PVDD, and at least part of the first power signal line PVDD is located in the third side frame area Frame3.

Under a condition that the charging unit 241 is arranged in the non-display area, the first power signal line PVDD may extend from the third side frame area Frame3 to the first side frame area Frame1 or the second side frame area Frame2 and be electrically connected to the charging unit 241.

Under a condition the charging unit 241 is located in the first side frame area Frame1, the first power signal line PVDD may extend from the third side frame area Frame3 to the first side frame area Frame1; and under a condition that the charging unit 241 is located in the second side frame area Frame2, the first power signal line PVDD may extend from the third side frame area Frame3 to the second side frame area Frame2.

Similarly, under a condition that both of the first side frame area Frame1 and the second side frame area Frame2 are provided with the charging unit 241, the first power signal line PVDD may extend from the third side frame area Frame3 to both of the first side frame area Frame1 and the second side frame area Frame2.

Figure 16:
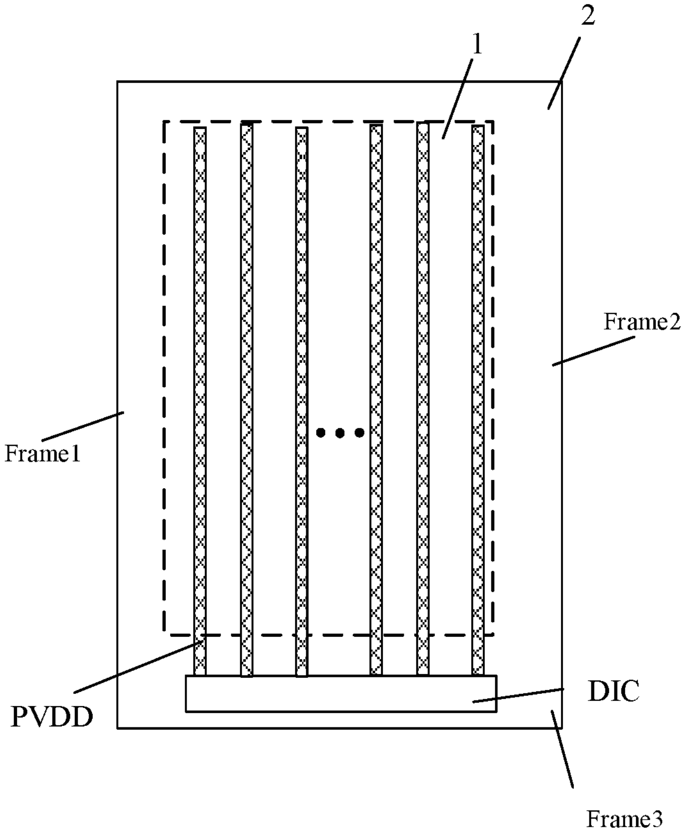
FIG. 16 shows a schematic diagram of the wiring of a first power signal line according to yet another embodiment of the present application.

Referring to FIG. 16, in some embodiments, a driving chip DIC may be arranged in the third side frame area Frame3, one end of the first power signal line PVDD may be electrically connected to a first power signal output end of the driving chip DIC, and the driving chip DIC may provide the first power signal through the first power signal output end.

The first power signal line PVDD may receive the first power signal provided by the driving chip DIC, and then provide the first power signal to the anode of the light emitting element L to drive the light emitting element L to emit light. The first power signal line PVDD may further charge the energy storage unit 242 through the first power signal to enable the energy storage unit 242 to be discharged so as to pre-charge the first node N1 in the non-light emitting stage.

It may be understood that the driving chip DIC may further include a second power signal output end, and one end of the second power signal line PVEE may be connected to the second power signal output end to receive a second power signal output by the driving chip DIC.

In some embodiments, the first power signal line PVDD may be electrically connected to the pixel circuit 20 as it extends into the display area 1, and electrically connected to a first terminal of the light emitting element L through the pixel circuit 20 to provide the first power signal to the light emitting element L. Similarly, the second terminal of the light emitting element L may be connected to the second power signal line PVEE extending into the display area 1 to receive the second power signal. The first terminal and the second terminal of the light emitting element L may be anode and cathode, respectively, and the light emitting element L may be driven by the first power signal and the second power signal to emit light.

Figure 17:
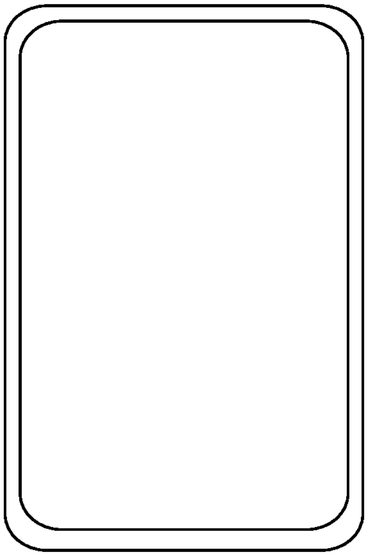
FIG. 17 shows a schematic structural diagram of a display apparatus according to an embodiment of the present application.

The embodiments of the present application further provide a display apparatus, and referring to FIG. 17, the display apparatus may be a PC, a TV, a display, a mobile terminal, a tablet, and a wearable device, etc. The display apparatus may include the display panel according to the embodiments of the present application.

The functional blocks as shown in the above structural diagrams may be implemented as hardware, software, firmware, or a combination thereof. When implemented as hardware, they may be, for example, electronic circuits, application specific integrated circuits (ASIC), appropriate firmware, plug-in, functional cards, etc. When implemented as software, the element of the present application is program or code segment that is used to perform the desired tasks. The program or code segment may be stored in a machine readable medium or transmitted over a transmission medium or communication link via a data signal carried in a carrier wave. The "machine readable medium" may include any medium capable of storing or transmitting information. Examples of the machine readable medium include electronic circuits, semiconductor memory devices, ROM, flash memory, erasable ROM (EROM), floppy disks, CD-ROMs, compact disks, hard disks, fiber optic media, radio frequency (RF) links, and the like. Code segment may be downloaded via a computer network such as the Internet, Intranets, etc.

It should be noted that in the present application, the terms "include", "comprise" or any other variation thereof are intended to express a non-exclusive inclusion, such that a process, method, article, or apparatus including a series of elements includes not only these elements, but also other elements that are not expressly listed, or elements inherent to such process, method, article, or apparatus.

Specific examples are utilized herein to illustrate the principles and implementation of the present application, and the above examples are illustrated only to facilitate the understanding of the methods and core gist of the present application. The above are only preferred embodiments of the present application, it should be noted that, due to the limitation of the literal expression, an infinite number of specific structures exist objectively, and for those of ordinary skill in the art, without departing from the principles of the present application, improvements, modifications, and changes can be made and the above technical features can be combined in an appropriate manner; these improvements, modifications, changes, and combinations, or direct applications of the ideas and technical solutions of the present application to other occasions without improvement, shall be considered as within the scope of the present application.

What is claimed is:

1. A display panel comprising a plurality of pixel units arranged in an array, each of the pixel units comprising a pixel circuit and a light emitting element;

the pixel circuit comprising a data writing module, a driving module, a light emitting control module and a pre-charging module;

the data writing module being configured to provide a data signal to the driving module;

the driving module being configured to provide a driving current to the light emitting element;

the light emitting control module being configured to selectively allow the light emitting element to enter a light emitting stage; and the pre-charging module being configured to increase a voltage of a first node to a first voltage in a non-light emitting stage, the first node being electrically connected to the light emitting control module and the light emitting element, wherein the first voltage is less than a light emitting threshold voltage of the light emitting element;

wherein the pre-charging module comprises:

a charging unit, a first end of the charging unit being electrically connected to a first power signal line;

an energy storage unit, a first end of the energy storage unit being electrically connected to a second end of the charging unit, a second end of the energy storage unit being electrically connected to a second power signal line; and a discharging unit, a first end of the discharging unit being electrically connected to the first end of the energy storage unit, a second end of the discharging unit being electrically connected to the first node.

2. The display panel of claim 1, wherein in a single non-light emitting stage, an on-time period of the charging unit does not overlap an on-time period of the discharging unit.

3. The display panel of claim 1, wherein the charging unit comprises a charging transistor, the energy storage unit comprises an energy storage capacitor, and the discharge unit comprises a discharging transistor; and a first terminal of the charging transistor is electrically connected to the first power signal line, a second terminal of the charging transistor is electrically connected to a first end of the energy storage capacitor, a second end of the energy storage capacitor is electrically connected to the second power signal line, a first terminal of the discharging transistor is electrically connected to the first end of the energy storage capacitor, and a second terminal of the discharging transistor is electrically connected to the first node.

4. The display panel of claim 1, wherein the non-light emitting stage comprises a pre-charging stage and a data writing stage;

in the pre-charging stage, the charging unit is configured to connect the first power signal line to the energy storage unit to charge the energy storage unit; and in the data writing stage, the discharging unit is configured to connect the energy storage unit to the first node to increase the voltage of the first node by discharging the energy storage unit.

5. The display panel of claim 1, wherein the pixel circuit comprises:

a first initialization module for initializing the driving module; and a second initialization module for initializing the first node, the voltage of the first node after being initialized being a second voltage less than the first voltage.

6. The display panel of claim 5, wherein a control end of the charging unit is electrically connected to a control end of the second initialization module, and a control end of the discharging unit is electrically connected to a control end of the data writing module.

7. The display panel of claim 1, wherein the plurality of pixel units comprises at least a first pixel unit, a second pixel unit and a third pixel unit, and the light emitting elements of the first pixel unit, the second pixel unit and the third pixel unit emit lights of different colors;

the pixel circuit of the first pixel unit, the pixel circuit of the second pixel unit, and the pixel circuit of the third pixel unit each comprise the data writing module, the driving module and the light emitting control module; and color of light emitted by the light emitting element of the first pixel unit is green, and the pixel circuit of the first pixel unit further comprises the pre-charging module.

8. The display panel of claim 1, wherein for j pixel units in a same pixel row, a number of the discharging units is j, a number of the charging units is greater than or equal to 1 and less than or equal to j, and a number of the energy storage units is greater than or equal to 1 and less than or equal to j.

9. The display panel of claim 8, wherein the j pixel units in the same pixel row further comprise:

j pixel circuits;

one charging unit, the first end of the charging unit being electrically connected to the first power signal line;

j energy storage units, the first end of the energy storage unit being electrically connected to the second end of the charging unit, the second end of the energy storage unit being electrically connected to the second power signal line, and a plurality of energy storage units in the same pixel row being electrically connected to a same charging unit; and j discharging units, for a same pixel circuit, the first end of the discharging unit being electrically connected to the first end of the energy storage unit, and the second end of the discharging unit being electrically connected to the first node of the pixel circuit.

10. The display panel of claim 8, wherein the j pixel units in the same pixel row further comprise:

j pixel circuits;

j charging units, the first end of the charging unit being electrically connected to the first power signal line, and the second ends of a plurality of charging units in the same pixel row being electrically connected to a same energy storage unit;

one energy storage unit, the first end of the energy storage unit being electrically connected to the second ends of the plurality of charging units in the same pixel row, the second end of the energy storage unit being electrically connected to the second power signal line; and j discharging units, for a same pixel circuit, the first end of the discharging unit being electrically connected to the second end of the charging unit, and the second end of the discharging unit being electrically connected to the first node of the pixel circuit.

11. The display panel of claim 8, wherein the j pixel units in the same pixel row further comprise:

j pixel circuits;

one charging unit, the first end of the charging unit being electrically connected to the first power signal line;

one energy storage unit, the first end of the energy storage unit being electrically connected to the second end of the charging unit, the second end of the energy storage unit being electrically connected to the second power signal line; and j discharging units, the first end of the discharging unit being electrically connected to the first end of the energy storage unit, a plurality of discharging units in the same pixel row being electrically connected to a same energy storage unit, and for a same pixel circuit, the second end of the discharging unit being electrically connected to the first node of the pixel circuit.

12. The display panel of claim 8, wherein the display panel comprises a display area and a non-display area, the display area comprises the plurality of pixel units; and for a same pixel row, under a condition that one charging unit and/or one energy storage unit is provided, the charging unit and/or the energy storage unit is arranged in the non-display area.

13. The display panel of claim 8, wherein the pixel units in a same row comprise pixel units emitting lights of at least two colors, and the first nodes of the pixel units in the same row emitting lights of a same color are electrically connected to a same energy storage unit.

14. The display panel of claim 13, wherein the display panel comprises a display area and a non-display area, the display area comprises the plurality of pixel units; and for a same pixel row, under a condition that the pixel units of a same color share one energy storage unit, the energy storage unit is arranged in the non-display area.

15. The display panel of claim 8, wherein for a same pixel row, under a condition that the number of the charging units is greater than or equal to a number of colors of light emitted by the pixel units, the charging units are arranged in a display area.

16. The display panel of claim 1, wherein the light emitting element comprises at least a first light emitting element and a second light emitting element emitting lights of different colors, and the energy storage unit comprises a first energy storage capacitor C1 corresponding to the first light emitting element and a second energy storage capacitor C2 corresponding to the second light emitting element; and wherein C1≠C2.

17. The display panel of claim 16, wherein an equivalent capacitance of the first light emitting element is Ceq1 and an equivalent capacitance of the second light emitting element is Ceq2; and wherein C1/Ceq1+C2/Ceq2.

18. The display panel of claim 16, wherein the increased voltage of the first node of the first light emitting element is V1 and the increased voltage of the first node of the second light emitting element is V2; and wherein V1≠V2.

19. The display panel of claim 18, wherein

V1>V2; and wherein color of light emitted by the first light emitting element is green, and color of light emitted by the second light emitting element is red or blue; or the color of light emitted by the first light emitting element is red, and the color of light emitted by the second light emitting element is blue.

20. A display apparatus comprising a display panel, the display panel comprising a plurality of pixel units arranged in an array, each of the pixel units comprising a pixel circuit and a light emitting element;

the pixel circuit comprising a data writing module, a driving module, a light emitting control module and a pre-charging module;

the data writing module being configured to provide a data signal to the driving module;

the driving module being configured to provide a driving current to the light emitting element;

the light emitting control module being configured to selectively allow the light emitting element to enter a light emitting stage; and the pre-charging module being configured to increase a voltage of a first node to a first voltage in a non-light emitting stage, the first node being electrically connected to the light emitting control module and the light emitting element, wherein the first voltage is less than a light emitting threshold voltage of the light emitting element;

wherein the pre-charging module comprises:

a charging unit, a first end of the charging unit being electrically connected to a first power signal line;

an energy storage unit, a first end of the energy storage unit being electrically connected to a second end of the charging unit, a second end of the energy storage unit being electrically connected to a second power signal line; and a discharging unit, a first end of the discharging unit being electrically connected to the first end of the energy storage unit, a second end of the discharging unit being electrically connected to the first node.

* * * * *